United States Patent
Westerman

(10) Patent No.: US 11,294,503 B2
(45) Date of Patent: Apr. 5, 2022

(54) SENSOR BASELINE OFFSET ADJUSTMENT FOR A SUBSET OF SENSOR OUTPUT VALUES

(71) Applicant: Apple Inc., Cupertino, CA (US)

(72) Inventor: Wayne Carl Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/152,326

(22) Filed: Oct. 4, 2018

(65) Prior Publication Data
US 2019/0034032 A1    Jan. 31, 2019

Related U.S. Application Data

(63) Continuation of application No. 15/006,987, filed on Jan. 26, 2016, now abandoned, which is a continuation of application No. 12/238,342, filed on Sep. 25, 2008, now abandoned.
(Continued)

(51) Int. Cl.
*G06F 3/041* (2006.01)
*G06F 3/0488* (2013.01)
(Continued)

(52) U.S. Cl.
CPC ........ *G06F 3/0418* (2013.01); *G06F 3/04883* (2013.01); *G06K 9/50* (2013.01); *G06T 7/337* (2017.01)

(58) Field of Classification Search
CPC ...... G06F 3/041; G06F 3/0416; G06F 3/0418; G06F 3/04182; G06F 3/04186;
(Continued)

(56) References Cited

U.S. PATENT DOCUMENTS

| 4,087,625 A | 5/1978 | Dym et al. |
| 4,090,092 A | 5/1978 | Serrano |

(Continued)

FOREIGN PATENT DOCUMENTS

| CN | 1202254 A | 12/1998 |
| CN | 1246638 A | 3/2000 |

(Continued)

OTHER PUBLICATIONS

First Action Interview Pilot Program Pre-Interview Communication, dated Apr. 4, 2019, for U.S. Appl. No. 15/686,969, filed Aug. 25, 2017, three pages.
(Continued)

*Primary Examiner* — Keith L Crawley
(74) *Attorney, Agent, or Firm* — Kubota & Basol LLP

(57) ABSTRACT

An image jaggedness filter is disclosed that can be used to detect the presence of ungrounded objects such as water droplets or coins, and delay periodic baseline adjustments until these objects are no longer present. To do otherwise could produce inaccurate normalized baseline sensor output values. The application of a global baseline offset is also disclosed to quickly modify the sensor offset values to account for conditions such as rapid temperature changes. Background pixels not part of any touch regions can be used to detect changes to no-touch sensor output values and globally modify the sensor offset values accordingly. The use of motion dominance ratios and axis domination confidence values is also disclosed to improve the accuracy of locking onto dominant motion components as part of gesture recognition.

12 Claims, 9 Drawing Sheets

Related U.S. Application Data

(60) Provisional application No. 61/019,222, filed on Jan. 4, 2008.

(51) Int. Cl.
*G06K 9/50* (2006.01)
*G06T 7/33* (2017.01)
*G06F 3/04883* (2022.01)

(58) Field of Classification Search
CPC .... G06F 3/044; G06F 3/0488; G06F 3/04883; G06T 7/337; G06K 9/50
See application file for complete search history.

(56) References Cited

U.S. PATENT DOCUMENTS

| | | | |
|---|---|---|---|
| 4,304,976 A | 12/1981 | Gottbreht et al. | |
| 4,475,235 A | 10/1984 | Graham | |
| 4,550,221 A * | 10/1985 | Mabusth | G06F 3/03547 178/18.06 |
| 4,659,874 A | 4/1987 | Landmeier | |
| 5,194,862 A | 3/1993 | Edwards | |
| 5,317,919 A | 6/1994 | Awtrey | |
| 5,459,463 A | 10/1995 | Gruaz et al. | |
| 5,483,261 A | 1/1996 | Yasutake | |
| 5,488,204 A | 1/1996 | Mead et al. | |
| 5,543,590 A | 8/1996 | Gillespie et al. | |
| 5,631,670 A | 5/1997 | Tomiyoshi et al. | |
| 5,825,352 A | 10/1998 | Bisset et al. | |
| 5,835,079 A | 11/1998 | Shieh | |
| 5,841,078 A | 11/1998 | Miller et al. | |
| 5,844,506 A | 12/1998 | Binstead | |
| 5,847,690 A | 12/1998 | Boie et al. | |
| 5,880,411 A | 3/1999 | Gillespie et al. | |
| 5,889,236 A | 3/1999 | Gillespie et al. | |
| 5,914,465 A | 6/1999 | Allen et al. | |
| 5,923,997 A | 7/1999 | Miyanaga et al. | |
| 6,057,903 A | 5/2000 | Colgan et al. | |
| 6,137,427 A | 10/2000 | Binstead | |
| 6,163,313 A | 12/2000 | Aroyan et al. | |
| 6,188,391 B1 | 2/2001 | Seely et al. | |
| 6,204,897 B1 | 3/2001 | Colgan et al. | |
| 6,239,788 B1 | 5/2001 | Nohno et al. | |
| 6,310,610 B1 | 10/2001 | Beaton et al. | |
| 6,323,846 B1 | 11/2001 | Westerman et al. | |
| 6,329,044 B1 | 12/2001 | Inoue et al. | |
| 6,452,514 B1 | 9/2002 | Philipp | |
| 6,456,952 B1 * | 9/2002 | Nathan | G06F 3/0418 178/18.01 |
| 6,587,358 B1 | 7/2003 | Yasumura | |
| 6,690,387 B2 | 2/2004 | Zimmerman et al. | |
| 6,730,863 B1 | 5/2004 | Gerpheide et al. | |
| 6,847,354 B2 | 1/2005 | Vranish | |
| 6,970,160 B2 | 11/2005 | Mulligan et al. | |
| 7,015,894 B2 | 3/2006 | Morohoshi | |
| 7,030,860 B1 | 4/2006 | Hsu et al. | |
| 7,129,935 B2 | 10/2006 | Mackey | |
| 7,138,686 B1 | 11/2006 | Banerjee et al. | |
| 7,180,508 B2 | 2/2007 | Kent et al. | |
| 7,184,064 B2 | 2/2007 | Zimmerman et al. | |
| 7,337,085 B2 | 2/2008 | Soss | |
| 7,395,717 B2 | 7/2008 | DeAngelis et al. | |
| 7,412,586 B1 | 8/2008 | Rajopadhye et al. | |
| 7,504,833 B1 * | 3/2009 | Seguine | G06K 9/0002 324/663 |
| 7,538,760 B2 | 5/2009 | Hotelling et al. | |
| 7,548,073 B2 | 6/2009 | Mackey et al. | |
| 7,580,030 B2 | 8/2009 | Marten | |
| 7,639,234 B2 | 12/2009 | Orsley | |
| 7,663,607 B2 | 2/2010 | Hotelling et al. | |
| 7,719,523 B2 | 5/2010 | Hillis | |
| 7,701,539 B2 | 8/2010 | Shih et al. | |
| 7,864,503 B2 | 1/2011 | Chang | |
| 7,898,122 B2 | 3/2011 | Andrieux et al. | |
| 7,907,126 B2 | 3/2011 | Yoon et al. | |
| 7,932,898 B2 | 4/2011 | Philipp et al. | |
| 8,026,904 B2 | 9/2011 | Westerman | |
| 8,040,142 B1 * | 10/2011 | Bokma | G01R 27/2605 324/658 |
| 8,040,321 B2 | 10/2011 | Peng | |
| 8,040,326 B2 | 10/2011 | Hotelling et al. | |
| 8,045,783 B2 | 10/2011 | Lee et al. | |
| 8,058,884 B2 | 11/2011 | Betancourt | |
| 8,068,097 B2 | 11/2011 | GuangHai | |
| 8,120,371 B2 | 2/2012 | Day et al. | |
| 8,125,312 B2 | 2/2012 | Orr | |
| 8,169,421 B2 | 5/2012 | Wright | |
| 8,223,133 B2 | 7/2012 | Hristov | |
| 8,258,986 B2 | 9/2012 | Makovetskyy | |
| 8,259,078 B2 | 9/2012 | Hotelling et al. | |
| 8,283,935 B2 | 10/2012 | Liu et al. | |
| 8,319,747 B2 | 11/2012 | Hotelling et al. | |
| 8,339,286 B2 | 12/2012 | Cordeiro | |
| 8,355,887 B1 | 1/2013 | Harding et al. | |
| 8,441,464 B1 | 5/2013 | Lin et al. | |
| 8,479,122 B2 | 7/2013 | Hotelling et al. | |
| 8,484,838 B2 | 7/2013 | Badaye et al. | |
| 8,487,898 B2 | 7/2013 | Hotelling | |
| 8,507,811 B2 | 8/2013 | Hotelling et al. | |
| 8,508,495 B2 | 8/2013 | Hotelling et al. | |
| 8,525,756 B2 | 9/2013 | Kwon | |
| 8,537,126 B2 | 9/2013 | Yousefpor et al. | |
| 8,542,208 B2 | 9/2013 | Krah et al. | |
| 8,576,193 B2 | 11/2013 | Hotelling | |
| 8,593,410 B2 | 11/2013 | Hong et al. | |
| 8,593,425 B2 | 11/2013 | Hong et al. | |
| 8,614,688 B2 | 12/2013 | Chang | |
| 8,633,915 B2 | 1/2014 | Hotelling et al. | |
| 8,665,237 B2 | 3/2014 | Koshiyama et al. | |
| 8,680,877 B2 | 3/2014 | Lee et al. | |
| 8,760,412 B2 | 6/2014 | Hotelling et al. | |
| 8,766,950 B1 | 7/2014 | Morein et al. | |
| 8,773,146 B1 | 7/2014 | Hills et al. | |
| 8,773,351 B2 | 7/2014 | Rekimoto | |
| 8,810,543 B1 | 8/2014 | Kurikawa | |
| 8,884,917 B2 | 11/2014 | Seo | |
| 8,902,172 B2 | 12/2014 | Peng | |
| 8,917,256 B2 | 12/2014 | Roziere | |
| 8,922,521 B2 | 12/2014 | Hotelling et al. | |
| 8,957,874 B2 | 2/2015 | Elias | |
| 8,976,133 B2 | 3/2015 | Yao et al. | |
| 8,982,096 B2 | 3/2015 | Hong et al. | |
| 8,982,097 B1 | 3/2015 | Kuzo et al. | |
| 9,000,782 B2 | 4/2015 | Roziere | |
| 9,001,082 B1 | 4/2015 | Rosenberg et al. | |
| 9,024,913 B1 | 5/2015 | Jung et al. | |
| 9,035,895 B2 | 5/2015 | Bussat et al. | |
| 9,075,463 B2 | 7/2015 | Pyo et al. | |
| 9,086,774 B2 | 7/2015 | Hotelling et al. | |
| 9,151,791 B2 | 10/2015 | Roziere | |
| 9,189,119 B2 | 11/2015 | Liao | |
| 9,250,757 B2 | 2/2016 | Roziere | |
| 9,261,997 B2 | 2/2016 | Chang et al. | |
| 9,280,251 B2 | 3/2016 | Shih | |
| 9,292,137 B2 | 3/2016 | Kogo | |
| 9,317,165 B2 | 4/2016 | Hotelling et al. | |
| 9,329,674 B2 | 5/2016 | Lee et al. | |
| 9,329,723 B2 | 5/2016 | Benbasat et al. | |
| 9,372,576 B2 | 6/2016 | Westerman | |
| 9,442,330 B2 | 9/2016 | Huo | |
| 9,535,547 B2 | 1/2017 | Roziere | |
| 9,582,131 B2 | 2/2017 | Elias | |
| 9,640,991 B2 | 5/2017 | Blondin et al. | |
| 9,690,397 B2 | 6/2017 | Shepelev et al. | |
| 9,785,295 B2 | 10/2017 | Yang | |
| 9,804,717 B2 | 10/2017 | Schropp, Jr. | |
| 9,874,975 B2 | 1/2018 | Benbasat et al. | |
| 9,880,655 B2 | 1/2018 | O'Connor | |
| 9,886,141 B2 | 2/2018 | Yousefpor | |
| 9,904,427 B1 | 2/2018 | Co | |
| 9,996,175 B2 | 6/2018 | Hotelling et al. | |
| 10,001,888 B2 | 6/2018 | Hong et al. | |
| 10,061,433 B2 | 8/2018 | Imai | |

(56) References Cited

U.S. PATENT DOCUMENTS

| | | |
|---|---|---|
| 10,175,832 B2 | 1/2019 | Roziere |
| 10,254,896 B2 | 4/2019 | Mori et al. |
| 10,289,251 B2 | 5/2019 | Shih et al. |
| 10,365,764 B2 | 7/2019 | Korapati et al. |
| 10,705,658 B2 | 7/2020 | Li et al. |
| 10,725,591 B1 | 7/2020 | Maharyta et al. |
| 2002/0015024 A1 | 2/2002 | Westerman et al. |
| 2002/0152048 A1 | 10/2002 | Hayes |
| 2003/0075427 A1 | 4/2003 | Caldwell |
| 2003/0076325 A1 | 4/2003 | Thrasher |
| 2003/0164820 A1 | 9/2003 | Kent |
| 2003/0210235 A1* | 11/2003 | Roberts ............... G06F 3/0414 345/173 |
| 2004/0017362 A1 | 1/2004 | Mulligan et al. |
| 2004/0061687 A1 | 4/2004 | Kent |
| 2004/0090429 A1 | 5/2004 | Geaghan et al. |
| 2004/0119701 A1 | 6/2004 | Mulligan et al. |
| 2004/0188151 A1 | 9/2004 | Gerpheide et al. |
| 2004/0189617 A1 | 9/2004 | Gerpheide et al. |
| 2004/0239650 A1 | 12/2004 | Mackey |
| 2004/0241920 A1 | 12/2004 | Hsiao et al. |
| 2004/0243747 A1 | 12/2004 | Rekimoto |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0104867 A1 | 5/2005 | Westerman et al. |
| 2005/0126831 A1 | 6/2005 | Richter et al. |
| 2005/0146509 A1 | 7/2005 | Geaghan et al. |
| 2005/0219228 A1 | 10/2005 | Alameh et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0026521 A1 | 2/2006 | Hotelling et al. |
| 2006/0038791 A1 | 2/2006 | Mackey |
| 2006/0097991 A1 | 5/2006 | Hotelling et al. |
| 2006/0132463 A1 | 6/2006 | Lee et al. |
| 2006/0146484 A1 | 7/2006 | Kim et al. |
| 2006/0161871 A1 | 7/2006 | Hotelling et al. |
| 2006/0197753 A1 | 9/2006 | Hotelling |
| 2006/0202969 A1 | 9/2006 | Hauck |
| 2006/0227115 A1* | 10/2006 | Fry ............... G06F 3/0416 345/173 |
| 2006/0238522 A1 | 10/2006 | Westerman et al. |
| 2006/0267953 A1* | 11/2006 | Peterson ............... G06F 3/0418 345/173 |
| 2006/0278444 A1 | 12/2006 | Binstead |
| 2006/0279548 A1 | 12/2006 | Geaghan |
| 2006/0293864 A1* | 12/2006 | Soss ............... G06F 3/0414 702/104 |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1* | 11/2007 | Pak ............... G06F 3/0418 345/173 |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0279619 A1 | 12/2007 | Chang |
| 2007/0283832 A1 | 12/2007 | Hotelling |
| 2007/0285365 A1 | 12/2007 | Lee |
| 2007/0296709 A1 | 12/2007 | Guanghai |
| 2008/0006454 A1 | 1/2008 | Hotelling |
| 2008/0007533 A1 | 1/2008 | Hotelling |
| 2008/0012835 A1 | 1/2008 | Rimon et al. |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042985 A1 | 2/2008 | Katsuhito et al. |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0100572 A1 | 5/2008 | Boillot |
| 2008/0136787 A1 | 6/2008 | Yeh et al. |
| 2008/0136792 A1* | 6/2008 | Peng ............... G06F 3/0416 345/174 |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0174321 A1 | 7/2008 | Kang et al. |
| 2008/0180365 A1 | 7/2008 | Ozaki |
| 2008/0188267 A1 | 8/2008 | Sagong |
| 2008/0224962 A1 | 9/2008 | Kasai et al. |
| 2008/0231292 A1 | 9/2008 | Ossart et al. |
| 2008/0238871 A1 | 10/2008 | Tam |
| 2008/0246496 A1 | 10/2008 | Hristov et al. |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0009485 A1 | 1/2009 | Bytheway |
| 2009/0019344 A1 | 1/2009 | Yoon et al. |
| 2009/0020343 A1 | 1/2009 | Rothkopf et al. |
| 2009/0054107 A1 | 2/2009 | Feland et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091546 A1 | 4/2009 | Joo et al. |
| 2009/0091551 A1 | 4/2009 | Hotelling et al. |
| 2009/0109192 A1 | 4/2009 | Liu et al. |
| 2009/0114456 A1* | 5/2009 | Wisniewski ............... G06F 3/0416 178/18.03 |
| 2009/0128516 A1 | 5/2009 | Rimon et al. |
| 2009/0135157 A1 | 5/2009 | Harley |
| 2009/0141046 A1 | 6/2009 | Rathnam et al. |
| 2009/0160787 A1 | 6/2009 | Westerman et al. |
| 2009/0174676 A1 | 7/2009 | Westerman |
| 2009/0174688 A1 | 7/2009 | Westerman |
| 2009/0179868 A1 | 7/2009 | Ayres et al. |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0212642 A1 | 8/2009 | Krah |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |

(56) References Cited

U.S. PATENT DOCUMENTS

| | | |
|---|---|---|
| 2009/0277695 A1 | 11/2009 | Liu et al. |
| 2009/0303189 A1 | 12/2009 | Grunthaner et al. |
| 2009/0309850 A1 | 12/2009 | Yang |
| 2009/0309851 A1 | 12/2009 | Bernstein |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0004029 A1 | 1/2010 | Kim |
| 2010/0006350 A1 | 1/2010 | Elias |
| 2010/0007616 A1 | 1/2010 | Jang |
| 2010/0019779 A1 | 1/2010 | Kato et al. |
| 2010/0031174 A1 | 2/2010 | Kim |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0090964 A1 | 4/2010 | Soo et al. |
| 2010/0097346 A1 | 4/2010 | Sleeman |
| 2010/0102027 A1 | 4/2010 | Liu et al. |
| 2010/0110035 A1 | 5/2010 | Selker |
| 2010/0117985 A1 | 5/2010 | Wadia |
| 2010/0123667 A1 | 5/2010 | Kim et al. |
| 2010/0139991 A1 | 6/2010 | Philipp et al. |
| 2010/0143848 A1 | 6/2010 | Jain et al. |
| 2010/0149108 A1 | 6/2010 | Hotelling et al. |
| 2010/0149127 A1 | 6/2010 | Fisher et al. |
| 2010/0156810 A1 | 6/2010 | Barbier et al. |
| 2010/0156846 A1 | 6/2010 | Long et al. |
| 2010/0182018 A1 | 7/2010 | Hazelden |
| 2010/0182278 A1 | 7/2010 | Li et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0194707 A1 | 8/2010 | Hotelling et al. |
| 2010/0201635 A1 | 8/2010 | Klinghult et al. |
| 2010/0245286 A1 | 9/2010 | Parker |
| 2010/0253638 A1 | 10/2010 | Yousefpor et al. |
| 2010/0259503 A1 | 10/2010 | Yanase et al. |
| 2010/0277418 A1 | 11/2010 | Huang et al. |
| 2010/0328228 A1 | 12/2010 | Elias |
| 2010/0328248 A1 | 12/2010 | Mozdzyn |
| 2010/0328262 A1 | 12/2010 | Huang et al. |
| 2010/0328263 A1 | 12/2010 | Lin |
| 2011/0001491 A1 | 1/2011 | Huang et al. |
| 2011/0006832 A1 | 1/2011 | Land et al. |
| 2011/0007020 A1 | 1/2011 | Hong et al. |
| 2011/0007021 A1 | 1/2011 | Bernstein et al. |
| 2011/0007030 A1 | 1/2011 | Mo et al. |
| 2011/0025623 A1 | 2/2011 | Lin |
| 2011/0025629 A1 | 2/2011 | Grivna et al. |
| 2011/0025635 A1 | 2/2011 | Lee |
| 2011/0061949 A1 | 3/2011 | Krah et al. |
| 2011/0074705 A1 | 3/2011 | Yousefpor et al. |
| 2011/0080391 A1 | 4/2011 | Brown et al. |
| 2011/0096016 A1 | 4/2011 | Yilmaz |
| 2011/0134050 A1 | 6/2011 | Harley |
| 2011/0157068 A1 | 6/2011 | Parker |
| 2011/0175846 A1 | 7/2011 | Wang et al. |
| 2011/0193776 A1 | 8/2011 | Oda et al. |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0234523 A1 | 9/2011 | Chang et al. |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1* | 12/2011 | Keski-Jaskari ....... G06F 3/0418 345/178 |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin |
| 2012/0050216 A1 | 3/2012 | Kremin et al. |
| 2012/0050217 A1 | 3/2012 | Noguchi et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0146726 A1 | 6/2012 | Huang |
| 2012/0146920 A1 | 6/2012 | Lin et al. |
| 2012/0146942 A1 | 6/2012 | Kamoshida et al. |
| 2012/0154324 A1 | 6/2012 | Wright et al. |
| 2012/0162121 A1 | 6/2012 | Chang et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0187965 A1 | 7/2012 | Roziere |
| 2012/0211264 A1 | 8/2012 | Milne |
| 2012/0249446 A1 | 10/2012 | Chen et al. |
| 2012/0262395 A1 | 10/2012 | Chan |
| 2012/0262410 A1 | 10/2012 | Lim |
| 2012/0287068 A1 | 11/2012 | Colgate et al. |
| 2012/0313881 A1 | 12/2012 | Ge et al. |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang |
| 2013/0057511 A1 | 3/2013 | Shepelev et al. |
| 2013/0069911 A1 | 3/2013 | You |
| 2013/0076648 A1 | 3/2013 | Krah et al. |
| 2013/0093712 A1 | 4/2013 | Liu et al. |
| 2013/0100038 A1 | 4/2013 | Yilmaz et al. |
| 2013/0100071 A1 | 4/2013 | Wright |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0215075 A1 | 8/2013 | Lee et al. |
| 2013/0224370 A1 | 8/2013 | Cok et al. |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0257798 A1 | 10/2013 | Tamura et al. |
| 2013/0265276 A1 | 10/2013 | Obeidat et al. |
| 2013/0271427 A1 | 10/2013 | Benbasat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0278543 A1 | 10/2013 | Hsu |
| 2013/0307821 A1 | 11/2013 | Kogo |
| 2013/0308031 A1 | 11/2013 | Theuwissen |
| 2013/0314342 A1 | 11/2013 | Kim et al. |
| 2013/0320994 A1 | 12/2013 | Brittain et al. |
| 2013/0321289 A1 | 12/2013 | Dubery et al. |
| 2013/0328759 A1 | 12/2013 | Al-Dahle et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022186 A1 | 1/2014 | Hong et al. |
| 2014/0022201 A1 | 1/2014 | Boychuk |
| 2014/0043546 A1 | 2/2014 | Yamazaki et al. |

(56) References Cited

U.S. PATENT DOCUMENTS

| | | |
|---|---|---|
| 2014/0070823 A1 | 3/2014 | Roziere |
| 2014/0071084 A1 | 3/2014 | Sugiura |
| 2014/0078096 A1 | 3/2014 | Tan et al. |
| 2014/0098051 A1 | 4/2014 | Hong et al. |
| 2014/0104194 A1 | 4/2014 | Davidson et al. |
| 2014/0104225 A1 | 4/2014 | Davidson et al. |
| 2014/0104228 A1 | 4/2014 | Chen et al. |
| 2014/0111707 A1 | 4/2014 | Song et al. |
| 2014/0118270 A1 | 5/2014 | Moses |
| 2014/0125628 A1 | 5/2014 | Yoshida et al. |
| 2014/0132534 A1 | 5/2014 | Kim |
| 2014/0132560 A1 | 5/2014 | Huang et al. |
| 2014/0132860 A1 | 5/2014 | Hotelling et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0160376 A1 | 6/2014 | Wang et al. |
| 2014/0168540 A1 | 6/2014 | Wang et al. |
| 2014/0192027 A1 | 7/2014 | Ksondzyk et al. |
| 2014/0204043 A1 | 7/2014 | Lin et al. |
| 2014/0204058 A1 | 7/2014 | Huang et al. |
| 2014/0210779 A1 | 7/2014 | Katsuta et al. |
| 2014/0232681 A1 | 8/2014 | Yeh |
| 2014/0232955 A1 | 8/2014 | Roudbari et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267128 A1 | 9/2014 | Bulea et al. |
| 2014/0267146 A1 | 9/2014 | Chang et al. |
| 2014/0267165 A1 | 9/2014 | Roziere |
| 2014/0285469 A1 | 9/2014 | Wright et al. |
| 2014/0306924 A1 | 10/2014 | Lin |
| 2014/0347574 A1 | 11/2014 | Tung et al. |
| 2014/0354301 A1 | 12/2014 | Trend |
| 2014/0362030 A1 | 12/2014 | Mo et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0009421 A1 | 1/2015 | Choi |
| 2015/0015528 A1 | 1/2015 | Vandermeijden |
| 2015/0026398 A1 | 1/2015 | Kim |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0062063 A1 | 3/2015 | Cheng et al. |
| 2015/0077375 A1 | 3/2015 | Hotelling et al. |
| 2015/0077394 A1 | 3/2015 | Dai et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0324035 A1 | 11/2015 | Yuan et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0011702 A1 | 1/2016 | Shih |
| 2016/0018348 A1 | 1/2016 | Yau et al. |
| 2016/0022218 A1 | 1/2016 | Hayes et al. |
| 2016/0034102 A1 | 2/2016 | Roziere et al. |
| 2016/0041629 A1 | 2/2016 | Rao |
| 2016/0048234 A1 | 2/2016 | Chandran et al. |
| 2016/0062533 A1 | 3/2016 | O'Connor |
| 2016/0077667 A1 | 3/2016 | Chiang |
| 2016/0117032 A1 | 4/2016 | Lin et al. |
| 2016/0139728 A1 | 5/2016 | Jeon et al. |
| 2016/0154505 A1 | 6/2016 | Chang |
| 2016/0154529 A1 | 6/2016 | Westerman |
| 2016/0170533 A1 | 6/2016 | Roziere |
| 2016/0195954 A1 | 7/2016 | Wang et al. |
| 2016/0216808 A1 | 7/2016 | Hotelling et al. |
| 2016/0224177 A1 | 8/2016 | Krah |
| 2016/0224189 A1 | 8/2016 | Yousefpor et al. |
| 2016/0246423 A1 | 8/2016 | Fu |
| 2016/0253041 A1 | 9/2016 | Park |
| 2016/0259448 A1 | 9/2016 | Guarneri |
| 2016/0266676 A1 | 9/2016 | Wang et al. |
| 2016/0266679 A1 | 9/2016 | Shahparnia et al. |
| 2016/0282980 A1 | 9/2016 | Chintalapoodi |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0060318 A1 | 3/2017 | Gu et al. |
| 2017/0090599 A1 | 3/2017 | Kuboyama et al. |
| 2017/0090619 A1 | 3/2017 | Yousefpor |
| 2017/0090622 A1 | 3/2017 | Badaye et al. |
| 2017/0097703 A1 | 4/2017 | Lee |
| 2017/0108968 A1 | 4/2017 | Roziere |
| 2017/0139539 A1 | 5/2017 | Yao et al. |
| 2017/0168626 A1 | 6/2017 | Konicek |
| 2017/0220156 A1 | 8/2017 | Blondin et al. |
| 2017/0229502 A1 | 8/2017 | Liu |
| 2017/0269729 A1 | 9/2017 | Chintalapoodi |
| 2017/0285804 A1 | 10/2017 | Yingxuan et al. |
| 2017/0315646 A1 | 11/2017 | Roziere |
| 2017/0357371 A1 | 12/2017 | Kim |
| 2018/0067584 A1 | 3/2018 | Zhu et al. |
| 2018/0224962 A1 | 8/2018 | Mori |
| 2018/0275824 A1 | 9/2018 | Li et al. |
| 2018/0307374 A1 | 10/2018 | Shah et al. |
| 2018/0307375 A1 | 10/2018 | Shah et al. |
| 2018/0367139 A1 | 12/2018 | Pribisic et al. |
| 2019/0138152 A1 | 5/2019 | Yousefpor et al. |
| 2019/0220115 A1 | 7/2019 | Mori et al. |
| 2020/0333902 A1 | 10/2020 | Li et al. |
| 2020/0341585 A1 | 10/2020 | Li et al. |
| 2020/0387259 A1 | 12/2020 | Krah |

FOREIGN PATENT DOCUMENTS

| | | | |
|---|---|---|---|
| CN | 1527274 | A | 9/2004 |
| CN | 1672119 | A | 9/2005 |
| CN | 1689677 | A | 11/2005 |
| CN | 1711520 | A | 12/2005 |
| CN | 1782837 | A | 6/2006 |
| CN | 1818842 | A | 8/2006 |
| CN | 1864124 | A | 11/2006 |
| CN | 1945516 | A | 4/2007 |
| CN | 101046720 | A | 10/2007 |
| CN | 101071354 | A | 11/2007 |
| CN | 101122838 | A | 2/2008 |
| CN | 101349957 | A | 1/2009 |
| CN | 101419516 | A | 4/2009 |
| CN | 201218943 | Y | 4/2009 |
| CN | 101840293 | A | 9/2010 |
| CN | 102023768 | A | 4/2011 |
| CN | 102411460 | A | 4/2012 |
| CN | 103049148 | A | 4/2013 |
| CN | 103052930 | A | 4/2013 |
| CN | 103221910 | A | 7/2013 |
| CN | 103258492 | A | 8/2013 |
| CN | 103294321 | A | 9/2013 |
| CN | 103365500 | A | 10/2013 |
| CN | 103365506 | A | 10/2013 |
| CN | 103577008 | A | 2/2014 |
| CN | 103809810 | A | 5/2014 |
| CN | 103885627 | A | 6/2014 |
| CN | 104020908 | A | 9/2014 |
| CN | 104142757 | A | 11/2014 |

(56) References Cited

FOREIGN PATENT DOCUMENTS

| | | |
|---|---|---|
| CN | 104252266 A | 12/2014 |
| CN | 105045446 A | 11/2015 |
| CN | 102648446 B | 1/2016 |
| CN | 105278739 A | 1/2016 |
| CN | 105474154 A | 4/2016 |
| CN | 105824461 A | 8/2016 |
| DE | 11 2008 001 245 T5 | 3/2010 |
| DE | 102011089693 A1 | 6/2013 |
| DE | 112012004912 T5 | 8/2014 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 455 264 A2 | 9/2004 |
| EP | 1 455 264 A3 | 9/2004 |
| EP | 1 644 918 A2 | 12/2004 |
| EP | 1 717 677 A2 | 11/2006 |
| EP | 1 717 677 A3 | 11/2006 |
| EP | 1745356 A2 | 1/2007 |
| EP | 1918803 A1 | 5/2008 |
| EP | 1 986 084 A1 | 10/2008 |
| EP | 2 077 489 A1 | 7/2009 |
| EP | 2144146 A1 | 1/2010 |
| EP | 2148264 A2 | 1/2010 |
| EP | 2224277 A1 | 9/2010 |
| EP | 2 256 606 A2 | 12/2010 |
| EP | 1455264 B1 | 5/2011 |
| FR | 2756048 A1 | 5/1998 |
| FR | 2896595 A1 | 7/2007 |
| FR | 2949008 A1 | 2/2011 |
| FR | 3004551 A1 | 10/2014 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 10-505183 A | 5/1998 |
| JP | 2000-163031 A | 6/2000 |
| JP | 3134925 B2 | 2/2001 |
| JP | 2002-342033 A | 11/2002 |
| JP | 2003-066417 A | 3/2003 |
| JP | 2004-503835 A | 2/2004 |
| JP | 2004-526265 A | 8/2004 |
| JP | 2005-30901 A | 2/2005 |
| JP | 2005-084128 A | 3/2005 |
| JP | 2005-301373 A | 10/2005 |
| JP | 2006-251927 A | 9/2006 |
| JP | 2007-018515 A | 1/2007 |
| JP | 2008-510251 A | 4/2008 |
| JP | 2008-117371 A | 5/2008 |
| JP | 2008-225415 A | 9/2008 |
| JP | 2009-86240 A | 4/2009 |
| JP | 2009-157373 A | 7/2009 |
| JP | 2010-528186 A | 8/2010 |
| KR | 10-2004-0002983 A | 1/2004 |
| KR | 10-20040091728 A | 10/2004 |
| KR | 10-20070002327 A | 1/2007 |
| KR | 10-2008-0019125 A | 3/2008 |
| KR | 10-2008-0041278 A | 5/2008 |
| KR | 10-2011-0044670 A | 4/2011 |
| KR | 10-2012-0085737 A | 8/2012 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | M352721 U | 3/2009 |
| TW | 201115442 A1 | 5/2011 |
| TW | 201203069 A | 1/2012 |
| TW | 2014/01129 A | 1/2014 |
| TW | 201419071 A | 5/2014 |
| WO | WO-99/35633 A2 | 7/1999 |
| WO | WO-99/35633 A3 | 7/1999 |
| WO | 2000/073984 A1 | 12/2000 |
| WO | WO-01/097204 A1 | 12/2001 |
| WO | 2002/080637 A1 | 10/2002 |
| WO | 2003/079176 A2 | 9/2003 |
| WO | 2004/013833 A2 | 2/2004 |
| WO | 2004/114265 A2 | 12/2004 |
| WO | 2004/013833 A3 | 8/2005 |
| WO | WO-2005/114369 A2 | 12/2005 |
| WO | WO-2005/114369 A3 | 12/2005 |
| WO | WO-2006/020305 A2 | 2/2006 |
| WO | WO-2006/020305 A3 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | 2006/126703 A2 | 11/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | 2007/054018 A1 | 5/2007 |
| WO | WO-2007/066488 A1 | 6/2007 |
| WO | WO-2007/089766 A2 | 8/2007 |
| WO | WO-2007/089766 A3 | 8/2007 |
| WO | WO-2007/115032 A2 | 10/2007 |
| WO | 2007/146780 A2 | 12/2007 |
| WO | WO-2007/146785 A2 | 12/2007 |
| WO | WO-2007/146785 A3 | 12/2007 |
| WO | 2007/115032 A3 | 1/2008 |
| WO | 2008/000964 A1 | 1/2008 |
| WO | WO-2008/007118 A2 | 1/2008 |
| WO | WO-2008/007118 A3 | 1/2008 |
| WO | 2008/030780 A1 | 3/2008 |
| WO | WO-2008/047990 A1 | 4/2008 |
| WO | WO-2008/076237 A2 | 6/2008 |
| WO | 2008/076237 A3 | 8/2008 |
| WO | 2007/146780 A3 | 9/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | 2011/015795 A2 | 2/2011 |
| WO | 2011/071784 A1 | 6/2011 |
| WO | 2011/015795 A3 | 7/2011 |
| WO | WO-2011/137200 A1 | 11/2011 |
| WO | 2013/093327 A1 | 6/2013 |
| WO | WO-2013/158570 A1 | 10/2013 |
| WO | 2014/105942 A1 | 7/2014 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/107969 A1 | 7/2015 |
| WO | WO-2015/178920 A1 | 11/2015 |
| WO | WO-2016/048269 A1 | 3/2016 |
| WO | 2016/066282 A1 | 5/2016 |
| WO | WO-2016/069642 A1 | 5/2016 |
| WO | WO-2016/126525 A1 | 8/2016 |
| WO | WO-2016/144437 A1 | 9/2016 |
| WO | 2017/058413 A1 | 4/2017 |
| WO | WO-2017/058415 A1 | 4/2017 |

OTHER PUBLICATIONS

Notice of Allowance dated Apr. 3, 2019, for U.S. Appl. No. 15/687,078, filed Aug. 25, 2017, eight pages.
Non-Final Office Action dated Jan. 2, 2019, for U.S. Appl. No. 15/522,737, filed Apr. 27, 2017, thirteen pages.
Non-Final Office Action dated Jan. 18, 2019, for U.S. Appl. No. 14/993,017, filed Jan. 11, 2016, 34 pages.

(56) References Cited

OTHER PUBLICATIONS

Non-Final Office Action dated Jan. 18, 2019, for U.S. Appl. No. 15/087,956, filed Mar. 31, 2016, twelve pages.
Notice of Allowance dated Dec. 31, 2018, for U.S. Appl. No. 14/318,157, filed Jun. 27, 2014, eight pages.
Notice of Allowance dated Mar. 11, 2019, for U.S. Appl. No. 15/087,956, filed Mar. 31, 2016, ten pages.
Non-Final Office Action dated Dec. 21, 2018, for U.S. Appl. No. 15/313,549, filed Nov. 22, 2016, thirteen pages.
Final Office Action dated Feb. 6, 2019, for U.S. Appl. No. 15/009,774, filed Jan. 28, 2016, fifteen pages.
Non-Final Office Action dated Feb. 11, 2019, for U.S. Appl. No. 15/507,722, filed Feb. 28, 2017, fifteen pages.
Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.
Chinese Search Report completed Dec. 14, 2011, for CN Patent Application No. ZL201020108330X, filed Feb. 2, 2010, with English Translation, 12 pages.
Chinese Search Report completed May 18, 2015, for CN Patent Application No. 201310042816.6, filed Feb. 2, 2010, two pages.
European Search Report dated Jul. 21, 2010, for EP Patent Application 10151969.2, three pages.
European Search Report dated Apr. 25, 2012, for EP Patent Application No. 08022505.5, 12 pages.
European Search Report dated Dec. 3, 2012, for EP Patent Application No. 12162177.5, seven pages.
European Search Report dated Feb. 13, 2013, for EP Patent Application No. 12192450.0, six pages.
European Search Report dated Aug. 31, 2015, for EP Application No. 15166813.4, eight pages.
European Search Report dated Jul. 27, 2017, for EP Application No. 14902458.0, four pages.
European Search Report dated Jan. 31, 2018, for EP Application No. 17183937.6, four pages.
Final Office Action dated Jan. 5, 2012, for U.S. Appl. No. 12/206,680, filed Sep. 8, 2008, 15 pages.
Final Office Action dated Jan. 3, 2013, for U.S. Appl. No. 11/818,498, filed Jun. 13, 2007, 17 pages.
Final Office Action dated Feb. 1, 2013, for U.S. Appl. No. 12/642,466, filed Dec. 18, 2009, nine pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, 7 pages.
Final Office Action dated May 22, 2013, for U.S. Appl. No. 12/206,680, filed Sep. 8, 2008, 16 pages.
Final Office Action dated Jun. 21, 2013, for U.S. Appl. No. 12/545,754, filed Aug. 21, 2009, 6 pages.
Final Office Action dated Jul. 19, 2013, for U.S. Appl. No. 12/545,604, filed Aug. 21, 2009, 17 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987, filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, fiied Sep. 25, 2008, 23 pages.
Final Office Action dated Jun. 11, 2015, for U.S. Appl. No. 13/448,182, filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.
Final Office Action dated Apr. 8, 2016, for U.S. Appl. No. 13/899,391, filed May 21, 2013, ten pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
Final Office Action dated Sep. 29, 2016, for U.S. Appl. No. 14/558,529, filed Dec. 2, 2014, 22 pages.
Final Office Action dated Nov. 4, 2016, for U.S. Appl. No. 14/082,003, filed Nov. 15, 2013, 18 pages.
Final Office Action dated Jul. 26, 2017, for U.S. Appl. No. 14/318,157, filed Jun. 27, 2014, 10 pages.
Final Office Action dated Aug. 10, 2017, for U.S. Appl. No. 14/645,120, filed Mar. 11, 2015, twelve pages.
Final Office Action dated Aug. 21, 2017, for U.S. Appl. No. 14/550,686, filed Nov. 21, 2014, 11 pages.
Final Office Action dated Dec. 5, 2017, for U.S. Appl. No. 15/006,987, filed Jan. 26, 2016, 16 pages.
Final Office Action dated May 14, 2018, for U.S. Appl. No. 15/006,987, filed Jan. 26, 2016, 11 pages.
Final Office Action dated May 17, 2018, for U.S. Appl. No. 15/017,463, filed Feb. 5, 2016, 22 pages.
Final Office Action dated Jul. 27, 2018, for U.S. Appl. No. 15/097,179, filed Apr. 12, 2016, 11 pages.
Final Office Action dated Aug. 16, 2018, for U.S. Appl. No. 14/993,017, filed Jan. 11, 2016, 35 pages.
International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, 4 pages.
International Search Report dated May 2, 2011, for PCT Application No. PCT/US2010/058988, filed Dec. 3, 2010, five pages.
International Search Report dated Aug. 6, 2013, for PCT Application No. PCT/US2013/036662, filed Apr. 15, 2013, three pages.
International Search Report dated Jan. 29, 2015, for PCT Application No. PCT/US2014/047888, filed Jul. 23, 2014, six pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated Mar. 9, 2012, for U.S. Appl. No. 12/238,342, filed Sep. 25, 2008, 26 pgs.
Non-Final Office Action dated May 3, 2012, for U.S. Appl. No. 12/238,333, filed Sep. 25, 2008, 22 pgs.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.

(56) References Cited

OTHER PUBLICATIONS

Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final office Action dated Jan. 7, 2013, for U.S. Appl. No. 12/545,604, filed Aug. 21, 2009, 12 pages.
Non-Final Office Action dated Jan. 7, 2013, for U.S. Appl. No. 12/238,333, filed Sep. 25, 2008, 20 pgs.
Non-Final Office Action dated Feb. 15, 2013, for U.S. Appl. No. 12/238,342, filed Sep. 25, 2008, 15 pages.
Non-Final Office Action dated Mar. 29, 2013 for U.S. Appl. No. 13/737,779, filed Jan. 9, 2013, nine pages.
Non-Final Office Action dated Sep. 6, 2013, for U.S. Appl. No. 12/847,987, filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, 9 pages.
Non-Final Office Action dated Jan. 31, 2014, for U.S. Appl. No. 13/448,182, filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Apr. 10, 2014, for U.S. Appl. No. 14/055,717, filed Oct. 16, 2013, 10 pages.
Non-Final Office Action dated Sep. 18, 2014, for U.S. Appl. No. 12/238,333, filed Sep. 25, 2008, 21 pages.
Non-Final Office Action dated Apr. 10, 2015, for U.S. Appl. No. 14/082,074, filed Nov. 15, 2013, 23 pages.
Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015 , for U.S. Appl. No. 14/550,686, filed Nov. 21, 2014, ten pages.
Non-Final Office Action dated Oct. 5, 2015, for U.S. Appl. No. 13/899,391, filed May 21, 2013, ten pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Non-Final Office Action dated Apr. 14, 2016, for U.S. Appl. No. 14/558,529, filed Dec. 2, 2014, twenty pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
Non-Final Office Action dated Dec. 14, 2016, for U.S. Appl. No. 14/550,686, filed Nov. 21, 2014, eight pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
Non-Final Office Action dated Jun. 14, 2017, for U.S. Appl. No. 15/006,987, filed Jan. 26, 2016, 14 pages.

Non-Final Office Action dated Jun. 26, 2017, for U.S. Appl. No. 14/558,529, filed Dec. 2, 2014, six pages.
Non-Final Office Action dated Sep. 14, 2017 , for U.S. Appl. No. 15/017,463, filed Feb. 5, 2016, 22 pages.
Non-Final Office Action dated Dec. 22, 2017 , for U.S. Appl. No. 14/993,017, filed Jan. 11, 2016, 23 pages.
Non-Final Office Action dated Jan. 22, 2018 , for U.S. Appl. No. 15/097,179, filed Apr. 12, 2016, 11 pages.
Non-Final Office Action dated Apr. 3, 2018, for U.S. Appl. No. 14/318,157, filed Jun. 27, 2014, twelve pages.
Non-Final Office Action dated Jun. 20, 2018, for U.S. Appl. No. 15/009,774, filed Jan. 28, 2016, seventeen pages.
Notice of Allowance dated Jun. 10, 2013, for U.S. Appl. No. 12/545,557, filed Aug. 21, 2009, 9 pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, ten pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, eight pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Notice of Allowance dated Dec. 2, 2016, for U.S. Appl. No. 14/615,186, filed Feb. 5, 2015, seven pages.
Notice of Allowance dated Sep. 20, 2017, for U.S. Appl. No. 14/082,003, filed Nov. 15, 2013, eight pages.
Notice of Allowance dated Sep. 20, 2017, for U.S. Appl. No. 15/144,706, filed May 2, 2016, nine pages.
Notice of Allowance dated Oct. 3, 2017, for U.S. Appl. No. 14/082,003, filed Nov. 15, 2013, nine pages.
Notice of Allowance dated Oct. 13, 2017, for U.S. Appl. No. 14/558,529, filed Dec. 2, 2014, eight pages.
Notice of Allowance dated Feb. 9, 2018, for U.S. Appl. No. 14/550,686, filed Nov. 21, 2014, 11 pages.
Notice of Allowance dated Mar. 1, 2018, for U.S. Appl. No. 14/645,120, filed Mar. 11, 2015, five pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120.].
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Apr. 29, 2009, for NL Application No. 2001672, with English translation of Written Opinion, eight pages.
Search Report dated Oct. 14, 2015, for TW Application No. 103116003, one page.
Search Report dated Nov. 12, 2015, for ROC (Taiwan) Patent Application No. 103105965, with English translation, two pages.
TW Search Report dated May 3, 2016, for TW Application No. 104115152, one page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Wilson, A.D. (Oct. 15, 2006). "Robust Computer Vision-Based Detection of Pinching for One and Two-Handed Gesture Input," *ACM, USIT 06*, Montreux, Switzerland, Oct. 15-18, 2006, pp. 255-258.

(56) References Cited

OTHER PUBLICATIONS

Yang, J-H. et al. (Jul. 2013). "A Noise-Immune High-Speed Readout Circuit for In-Cell Touch Screen Panels," *IEEE Transactions on Circuits and Systems—1: Regular Papers* 60(7):1800-1809.
Advisory Action received for U.S. Appl. No. 11/818,498, dated May 17, 2013, 5 pages.
Advisory Action received for U.S. Appl. No. 11/818,498, dated Oct. 14, 2011, 5 pages.
Advisory Action received for U.S. Appl. No. 12/206,680, dated Apr. 16, 2012, 3 pages.
Advisory Action received for U.S. Appl. No. 12/238,333, dated Dec. 17, 2013, 3 pages.
Advisory Action received for U.S. Appl. No. 12/238,333, dated Oct. 21, 2015, 4 pages.
Advisory Action received for U.S. Appl. No. 12/500,911, dated May 17, 2013, 3 pages.
Advisory Action received for U.S. Appl. No. 12/642,466, dated May 23, 2013, 2 pages.
Advisory Action received for U.S. Appl. No. 14/082,003, dated Mar. 10, 2016, 3 pages.
Advisory Action received for U.S. Appl. No. 14/645,120, dated Nov. 25, 2016, 3 pages.
Advisory Action received for U.S. Appl. No. 15/017,463, dated Aug. 8, 2018, 3 pages.
Decision to Grant received for European Patent Application No. 16704768.7, dated May 23, 2019, 1 page.
Final Office Action received for U.S. Appl. No. 11/818,498, dated Jun. 10, 2011, 16 pages.
Final Office Action received for U.S. Appl. No. 12/038,760, dated Jul. 23, 2013, 20 pages.
Final Office Action received for U.S. Appl. No. 12/038,760, dated Jun. 8, 2011, 21 pages.
Final Office Action received for U.S. Appl. No. 12/110,024, dated Dec. 24, 2012, 21 pages.
Final Office Action received for U.S. Appl. No. 12/110,024, dated Jan. 19, 2012, 12 pages.
Final Office Action received for U.S. Appl. No. 12/110,075, dated Aug. 31, 2012, 15 pages.
Final Office Action received for U.S. Appl. No. 12/333,250, dated Dec. 15, 2011, 13 pages.
Final Office Action received for U.S. Appl. No. 14/157,737, dated Aug. 31, 2015, 28 pages.
Final Office Action received for U.S. Appl. No. 14/997,031, dated Jun. 14, 2018, 19 pages.
Final Office Action received for U.S. Appl. No. 15/090,555, dated Aug. 29, 2018, 18 pages.
Final Office Action received for U.S. Appl. No. 15/228,942, dated Apr. 17, 2019, 9 pages.
Final Office Action received for U.S. Appl. No. 15/313,549, dated Dec. 18, 2019, 24 pages.
Final Office Action received for U.S. Appl. No. 15/507,722, dated Sep. 13, 2019, 18 pages.
Final Office Action received for U.S. Appl. No. 15/522,737, dated Sep. 12, 2019, 15 pages.
Final Office Action received for U.S. Appl. No. 16/201,730, dated Nov. 1, 2019, 11 pages.
First Action Interview Office Action received for U.S. Appl. No. 15/686,969, dated Aug. 19, 2019, 7 pages.
First Action Interview received for U.S. Appl. No. 15/228,942, dated Nov. 26, 2018, 5 pages.
Gibilisco, Stan, "The Illustrated Dictionary of Electronics", Eighth Edition, p. 173.
Intention to Grant received for European Patent Application No. 15166813.4, dated Sep. 20, 2019, 8 pages.
International Preliminary Report on Patentability received for PCT Patent Application No. PCT/US2010/022868, dated Jan. 27, 2011, 10 pages.
International Search Report received for PCT Patent Application No. PCT/US2008/078836, dated Mar. 19, 2009, 4 pages.
International Search Report received for PCT Patent Application No. PCT/US2009/041460, dated Jul. 17, 2009, 3 pages.
International Search Report received for PCT Patent Application No. PCT/US2009/041465, dated Aug. 5, 2009, 4 pages.
International Search Report received for PCT Patent Application No. PCT/US2014/039245, dated Sep. 24, 2014, 3 pages.
International Search Report received for PCT Patent Application No. PCT/US2014/056795, dated Dec. 12, 2014, 3 pages.
International Search Report received for PCT Patent Application No. PCT/US2015/057644, dated Jan. 8, 2016, 3 pages.
International Search Report received for PCT Patent Application No. PCT/US2016/048694, dated Oct. 31, 2016, 6 pages.
Non-Final Office Action received for U.S. Appl. No. 11/818,498, dated Dec. 13, 2010, 16 pages.
Non-Final Office Action received for U.S. Appl. No. 12/038,760, dated Jan. 2, 2013, 20 pages.
Non-Final Office Action received for U.S. Appl. No. 12/110,024, dated Jul. 3, 2012, 20 pages.
Non-Final Office Action received for U.S. Appl. No. 12/110,024, dated Jul. 11, 2011, 13 pages.
Non-Final Office Action received for U.S. Appl. No. 12/110,075, dated Jan. 25, 2012, 22 pages.
Non-Final Office Action received for U.S. Appl. No. 12/110,075, dated Jul. 8, 2011, 15 pages.
Non-Final Office Action received for U.S. Appl. No. 12/110,075, dated Mar. 28, 2013, 14 pages.
Non-Final Office Action received for U.S. Appl. No. 12/333,250, dated Aug. 17, 2011, 13 pages.
Non-Final Office Action received for U.S. Appl. No. 14/157,737, dated Feb. 10, 2015, 24 pages.
Non-Final Office Action received for U.S. Appl. No. 15/009,774, dated Sep. 4, 2019, 18 pages.
Non-Final Office Action received for U.S. Appl. No. 15/017,463, dated May 15, 2019, 20 pages.
Non-Final Office Action received for U.S. Appl. No. 15/090,555, dated Nov. 3, 2017, 28 pages.
Non-Final Office Action received for U.S. Appl. No. 15/313,549, dated Jul. 10, 2019, 25 pages.
Non-Final Office Action received for U.S. Appl. No. 16/201,730, dated May 10, 2019, 9 pages.
Notice of Allowance received for U.S. Appl. No. 12/038,760, dated Nov. 8, 2013, 15 pages.
Notice of Allowance received for U.S. Appl. No. 12/110,024, dated May 23, 2013, 5 pages.
Notice of Allowance received for U.S. Appl. No. 12/110,075, dated Aug. 19, 2013, 8 pages.
Notice of Allowance received for U.S. Appl. No. 12/333,250, dated Aug. 28, 2012, 10 pages.
Notice of Allowance received for U.S. Appl. No. 12/545,604, dated Oct. 5, 2015, 9 pages.
Notice of Allowance received for U.S. Appl. No. 14/157,737, dated Dec. 14, 2015, 5 pages.
Notice of Allowance received for U.S. Appl. No. 14/329,719, dated Nov. 2, 2015, 9 pages.
Notice of Allowance received for U.S. Appl. No. 14/993,017, dated Jul. 12, 2019, 10 pages.
Notice of Allowance received for U.S. Appl. No. 15/090,555, dated Feb. 12, 2019, 7 pages.
Notice of Allowance received for U.S. Appl. No. 15/228,942, dated Aug. 30, 2019, 12 pages.
Notice of Allowance received for U.S. Appl. No. 15/686,969, dated Jan. 2, 2020, 8 pages.
Notice of Allowance received for U.S. Appl. No. 15/691,283, dated Jun. 5, 2019, 10 pages.
Notification of Grant received for Korean Patent Application No. 10-2016-7003645, dated May 31, 2019, 3 pages (1 page of English Translation and 2 pages of Official Copy).
Notification to Grant received for Chinese Patent Application No. 201610790093.1, dated Apr. 30, 2019, 4 pages (2 pages of English Translation and 2 page of Official Copy).
O'Connor, Todd, "mTouch Projected Capacitive Touch Screen Sensing Theory of Operation", Microchip TB3064, Microchip Technology Inc., pp. 1-16.

(56) References Cited

OTHER PUBLICATIONS

Office Action received for Australian Patent Application No. 2019200698, dated Nov. 23, 2019, 3 pages.
Office Action received for Chinese Patent Application No. 201310330348.2, dated Nov. 3, 2015, 7 pages (4 pages of English Translation and 3 pages of Official copy).
Office Action received for Chinese Patent Application No. 201480081612.6, dated Jun. 4, 2019, 22 pages (11 of English Translation and 11 pages of Official Copy).
Office Action received for Chinese Patent Application No. 201580058366.7, dated May 28, 2019, 19 pages (10 pages of English Translation and 9 pages of Official Copy).
Office Action received for Chinese Patent Application No. 201680012966.4, dated Nov. 1, 2019, 19 pages (10 pages of English Translation and 9 pages of Official copy).
Preinterview First Office Action received for U.S. Appl. No. 15/228,942, dated Sep. 13, 2018, 4 pages.
Restriction Requirement received for U.S. Appl. No. 12/238,333, dated Mar. 8, 2012, 6 pages.
Restriction Requirement received for U.S. Appl. No. 12/494,173, dated Aug. 8, 2012, 5 pages.
Restriction Requirement received for U.S. Appl. No. 13/899,391, dated Apr. 8, 2015, 6 pages.
Restriction Requirement received for U.S. Appl. No. 15/087,956, dated Feb. 13, 2018, 8 pages.
Restriction Requirement received for U.S. Appl. No. 15/097,179, dated Sep. 28, 2017, 6 pages.
Restriction Requirement received for U.S. Appl. No. 15/228,942, dated Mar. 21, 2018, 6 pages.
Restriction Requirement received for U.S. Appl. No. 15/691,283, dated Mar. 5, 2019, 6 pages.
Search Report received for Chinese Patent Application No. 200820133814.2, dated Jan. 10, 2011, 25 pages.
Search Report received for Chinese Patent Application No. 200920008199.7, dated Jan. 7, 2011, 14 pages.
Search Report received for Chinese Patent Application No. ZL2009201524013, completed on Jun. 3, 2011, 20 pages.
Search Report received for European Patent Application No. 08017396.6, dated Mar. 19, 2009, 7 pages.
Search Report received for Great Britain Patent Application No. GB0817242.1, dated Jan. 19, 2009, 2 pages.
Search Report received for Great Britain Patent Application No. GB0817242.1, dated Jan. 19, 2010, 2 pages.
Written Opinion received for PCT Patent Application No. PCT/US2010/022868, dated Mar. 10, 2010, 4 pages.
Examiner's Answer to Appeal Brief received for U.S. Appl. No. 11/818,498, dated Dec. 20, 2013, 17 pages.
Extended European Search Report received for European Patent Application No. 18197785.1, dated Apr. 5, 2019, 8 pages.
Final Office Action received for U.S. Appl. No. 15/017,463, dated Feb. 13, 2020, 22 pages.
Non-Final Office Action received for U.S. Appl. No. 15/313,549, dated Apr. 23, 2020, 33 pages.
Notice of Allowance received for U.S. Appl. No. 15/009,774, dated Mar. 20, 2020, 16 pages.
Notice of Allowance received for U.S. Appl. No. 15/507,722, dated Feb. 27, 2020, 9 pages.
Notice of Allowance received for U.S. Appl. No. 15/522,737, dated Mar. 6, 2020, 8 pages.
Patent Board Decision received for U.S. Appl. No. 11/818,498, dated Nov. 2, 2016, 8 pages.
Search Report received for Chinese Patent Application No. 201680008313.9, dated Jul. 5, 2019, 4 pages (2 pages English Translation and 2 pages of Official copy).
Supplemental Notice of Allowance received for U.S. Appl. No. 15/686,969, dated Feb. 21, 2020, 2 pages.
Lowe, Doug, "Electronics Components: How to Use an Op Amp as a Voltage Comparator", Dummies, Available online at :<https://www.dummies.com/programming/electronics/components/electronics-components-how-to-use-an-pp-amp-as-a-voltage-comparator/>, 2012, 9 pages.
Notice of Allowance received for U.S. Appl. No. 15/009,774, dated Jul. 1, 2020, 6 pages.
Notice of Allowance received for U.S. Appl. No. 15/313,549, dated Oct. 21, 2020, 10 pages.
Non-Final Office Action received for U.S. Appl. No. 16/921,817, dated Sep. 22, 2021, 24 pages.
Non-Final Office Action received for U.S. Appl. No. 16/924,047, dated Sep. 24, 2021, 17 pages.
Non-Final Office Action received for U.S. Appl. No. 17/003,133, dated Aug. 3, 2021, 22 pages.

* cited by examiner

SENSOR BASELINE OFFSET ADJUSTMENT FOR A SUBSET OF SENSOR OUTPUT VALUES

CROSS REFERENCE TO RELATED APPLICATIONS

This application is a continuation of U.S. patent application Ser. No. 15/006,987, filed Jan. 26, 2016 and published on Jun. 2, 2016 as U.S. Patent Publication No. 2016/0154529, which claims the benefit of U.S. patent application Ser. No. 12/238,342, filed Sep. 25, 2008 and published on Jul. 9, 2009 as U.S. Patent Publication No. 2009/0174676, which claims the benefit of U.S. Provisional Patent Application No. 61/019,222 filed on Jan. 4, 2008, the contents of which are incorporated herein by reference in their entirety for all purposes.

FIELD OF THE INVENTION

This relates to touch sensor panels used as input devices for computing systems, and more particularly, to the normalization and post-processing of touch sensor data.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned partially or completely in front of a display screen, or integrated partially or entirely within the display screen, so that at least a portion of the touch-sensitive surface covers at least a portion of the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch sensor panels can be capable of detecting either single-touch events or multiple touch events, an example of which is described in Applicant's co-pending U.S. application Ser. No. 11/649,998 entitled "Proximity and Multi-Touch Sensor Detection and Demodulation," filed on Jan. 3, 2007 and published as U.S. Patent Application Publication No. 2008/0158172, the contents of which are incorporated by reference herein in their entirety for all purposes.

To provide a more uniform response from the touch sensor panel given the same amount of touch, the sensor output values can be calibrated or normalized by using offset values to compensate the raw no-touch output values for each sensor in the panel so that all sensor output values are normalized to approximately the same value. A periodic local baseline offset adjustment algorithm can then be employed to locally update the sensor offset values to account for variables such as temperature drift. However, when ungrounded objects such as water droplets or coins are present on the touch sensor panel, the periodic local baseline offset adjustment algorithm can generate inaccurate normalized results. Furthermore, factors such as temperature changes can rapidly skew the normalized sensor output values. In addition, when processing touch data to recognize gestures, it can be difficult to clearly identify and lock onto a particular dominant motion component as a preliminary step in recognizing a particular gesture.

SUMMARY OF THE INVENTION

This relates to an image jaggedness filter that can be used to detect the presence of ungrounded objects such as water droplets or coins on a touch sensor panel, and delay periodic local offset adjustments until these objects have largely disappeared. To do otherwise could produce inaccurate normalized sensor output values. This also relates to the application of a global baseline offset to quickly normalize the sensor output values to account for conditions such as rapid temperature changes. Background pixels not part of any touch regions can be used to detect changes to no-touch sensor output values and compute a global baseline offset accordingly. This also relates to the use of motion dominance ratios and axis domination confidence values to improve the accuracy of locking onto dominant motion components as part of gesture recognition.

DETAILED DESCRIPTION OF THE PREFERRED EMBODIMENT

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to an image jaggedness filter that can be used to detect the presence of ungrounded objects such as water droplets or coins, and delay periodic local baseline offset adjustments until these objects have largely disappeared. To do otherwise could produce inaccurate normalized sensor output values. This also relates to the application of a global baseline offset to quickly modify the sensor offset values to account for conditions such as rapid temperature changes. Background pixels not part of any touch regions can be used to detect changes to no-touch sensor output values and compute the global baseline offset accordingly. This also relates to the use of motion dominance ratios and axis domination confidence values to improve the accuracy of locking onto dominant motion components as part of gesture recognition.

Image Jaggedness Filter for Baseline Calculations

To provide a more uniform response from the touch sensor panel given the same amount of touch, touch sensor panel output values can be calibrated using offset values to adjust the raw no-touch output values for each sensor in the panel so that all touch sensor panel output values are normalized to approximately the same value. However, even with normalized sensor outputs, temperature drift and other factors can cause the sensor output values to change, which will tend to skew the normalized baseline. To account for these gradual changes to the normalized sensor output values, a periodic local baseline offset adjustment algorithm can be employed.

Figure 1A:
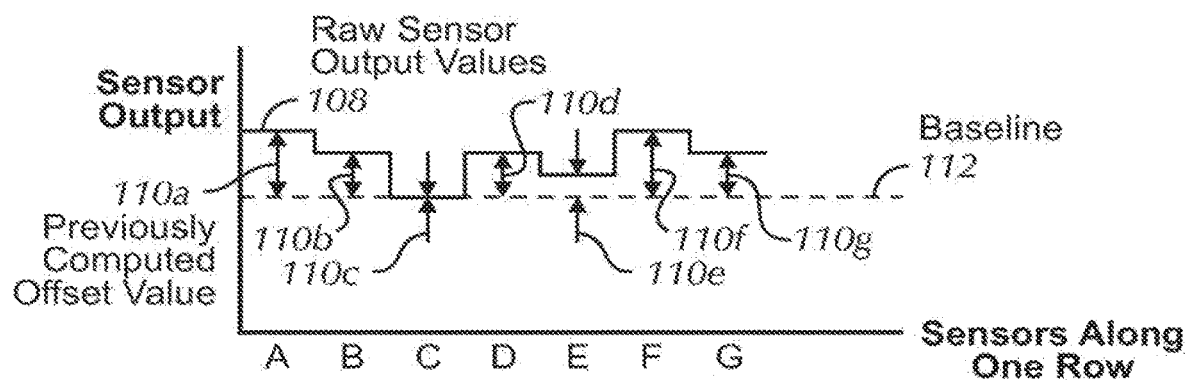
FIGS. 1a-1c illustrate an exemplary periodic local baseline adjustment for a single row of pixels in a touch sensor panel according to embodiments of the invention.
Figure 1B:
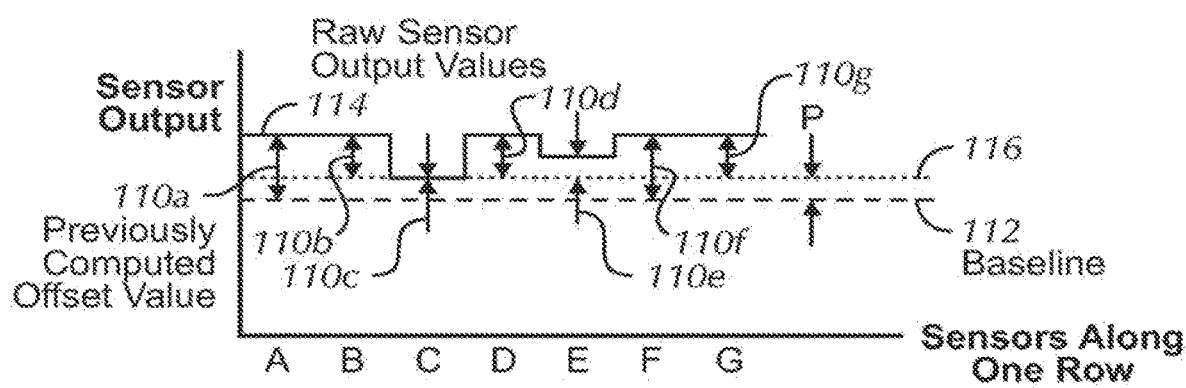
Figure 1C:
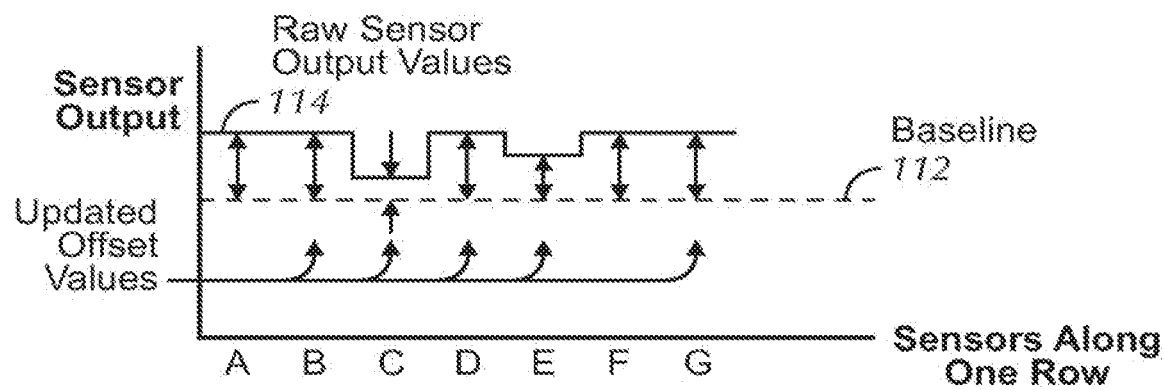

FIGS. 1a-1c illustrate an exemplary periodic local baseline adjustment for a single row of pixels (sensors) A-G in a touch sensor panel according to embodiments of the invention. Although not shown, it should be understood that each row in the touch sensor panel can also be subject to this periodic local baseline adjustment. The periodic local baseline offset adjustment algorithm can increment or decrement individual sensor offset values by one count or unit, or some small value to provide periodic fine-tuning of the offsets to track temperature drift or other shifts in the sensor output values.

As shown in FIG. 1a, to perform this periodic local baseline offset adjustment, a no-touch scan of the sensor panel is performed after a dynamic adjustment time interval has passed, and raw sensor output values 108 are obtained. The adjustment time interval is generally much longer than the frame rate (the time it takes to scan the entire sensor panel one time). Previously computed offset values for each sensor (see 110-A through 110-G) are then subtracted from the measured raw sensor output values 108 to normalize them. Ideally, as shown in FIG. 1a, the subtraction results in all normalized sensor output values being equal to the same baseline value 112.

However, as shown in FIG. 1b, if some of the no-touch measured raw sensor output values 114 shift due to a change in some condition such as a temperature increase, for example, after subtraction of the offset values 110-A through 110-G, some of the normalized sensor output values may be equal to some value other than baseline value 112, such as value 116 in FIG. 1b. To adjust for this shift according to embodiments of the invention, all sensors having normalized sensor output values that are positive and negative as compared to the baseline 112 are identified. (In the example of FIG. 1b, the normalized sensor values for sensors B-E and G are positive.) For any sensors with normalized sensor output values that are positive, their corresponding offset values are incremented by P, where P may be one count, or a small value, or a percentage of the positive value. In the example of FIG. 1b, P represents the full difference between value 116 and the original baseline 112, but it should be understood that if P represents less than the full difference between value 116 and the original baseline 112, multiple periodic local baseline offset adjustments can eventually take up the full difference. Similarly, for any sensors with normalized sensor output values that are negative, their corresponding offset values are decremented by Q, where Q may be one count, or a small value, or a percentage of the negative value. The algorithm waits the duration of an adjustment period before scanning the panel again.

As shown in FIG. 1c, after the sensor offset values for sensors B-E and G have been adjusted, the normalized sensor output values should be closer to the original baseline 112. In the example of FIG. 1c, because the offset adjustment value P represented the full difference between value 116 and the original baseline 112, the normalized sensor output values equal the original baseline 112.

Despite this normalization, in multi-touch sensor panels, certain pixels can generate false, erroneous or otherwise distorted readings when two or more simultaneous touch events are generated by the same poorly grounded object. Compensation of these distorted readings (so-called "negative pixels") is described in U.S. application Ser. No. 11/963,578 entitled "Negative Pixel Compensation," the contents of which are incorporated by reference herein in their entirety for all purposes. To compensate for these distorted readings, a predicted negative pixel value can first be computed as an indicator of pixels that are likely to be distorted. The predicted negative pixel value for any particular pixel can be computed by summing up the touch output values for pixels in the drive line of the particular pixel being considered, summing up the touch output values for pixels in the sense line of the particular pixel being considered, and then multiplying these two sums. A scaled function of the predicted negative pixel value can then be added to the measured touch output value for the pixel to compensate for artificially negative readings.

However, due to physical design changes, state-of-the-art touch sensor panels can have a greater incidence of negative pixels than previous touch sensor panels. In trackpad embodiments, for example, negative pixels can appear more frequently due to the expected frequent usage of unplugged notebook computers, which can cause a higher incidence of touches by ungrounded objects. Thus, for a given image of touch, there can be a higher sum of negative and positive pixels than in previous designs.

Water droplets on a touch sensor panel can also appear as ungrounded objects. On trackpads, where user fingers and palms are often touching (sometimes inadvertently) the panel, water droplets can easily get smeared. Therefore, if the possible presence of water droplets can be detected, it would be preferable to hold off on any periodic local baseline offset adjustment until the water has dried off, because of the likely existence of corrupting negative pixels.

To suppress periodic local baseline offset adjustments in the presence of water droplets, extra filters can first be employed to detect the presence of water droplets. To detect water droplets, a jaggedness/irregularity filter can be used, as described in U.S. application Ser. No. 11/619,490 entitled "Irregular Input Identification" and U.S. application Ser. No. 11/756,211 entitled "Multi-touch Input Discrimination," both of which are incorporated by reference herein in their entirety for all purposes. This jaggedness/irregularity filter can be used to find touch images having a high spatial frequency, such as those caused by water droplets.

Figure 2A:
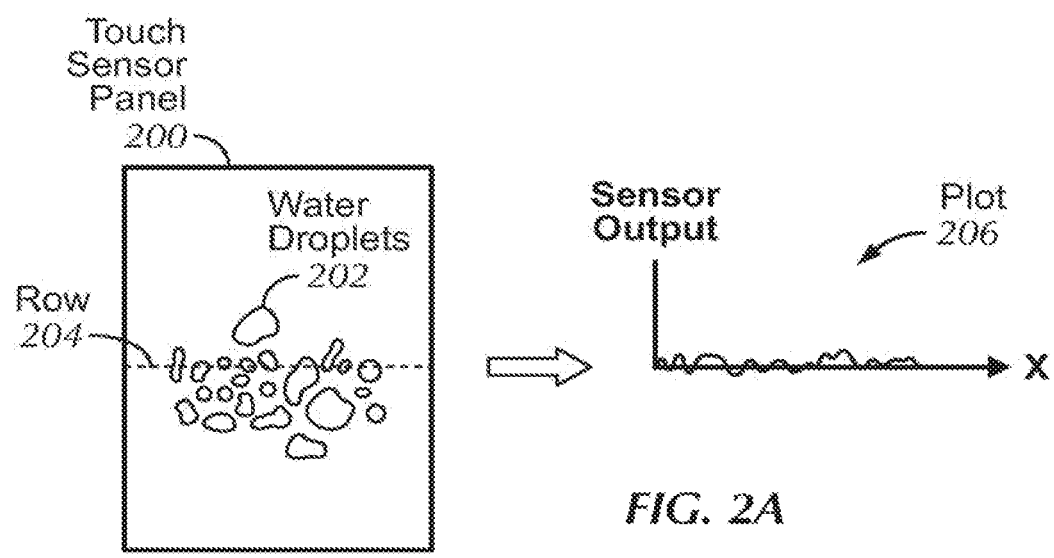
FIG. 2a illustrates an exemplary touch sensor panel having water droplets on its touch surface and the resulting touch image having a high spatial frequency.

FIG. 2a illustrates an exemplary touch sensor panel 200 having water droplets 202 on its touch surface. The sensors in row 204 can generate touch outputs as shown in plot 106. Plot 206 shows that water droplets 202, being ungrounded, can generate raw touch sensor output values having a high spatial frequency (a high frequency of occurrence of touch images in space), a certain jaggedness in the captured image, and a number of positive and negative pixels. Although not shown in FIG. 2, a similar plot can be obtained for every row and column in touch sensor panel 200.

Figure 2B:
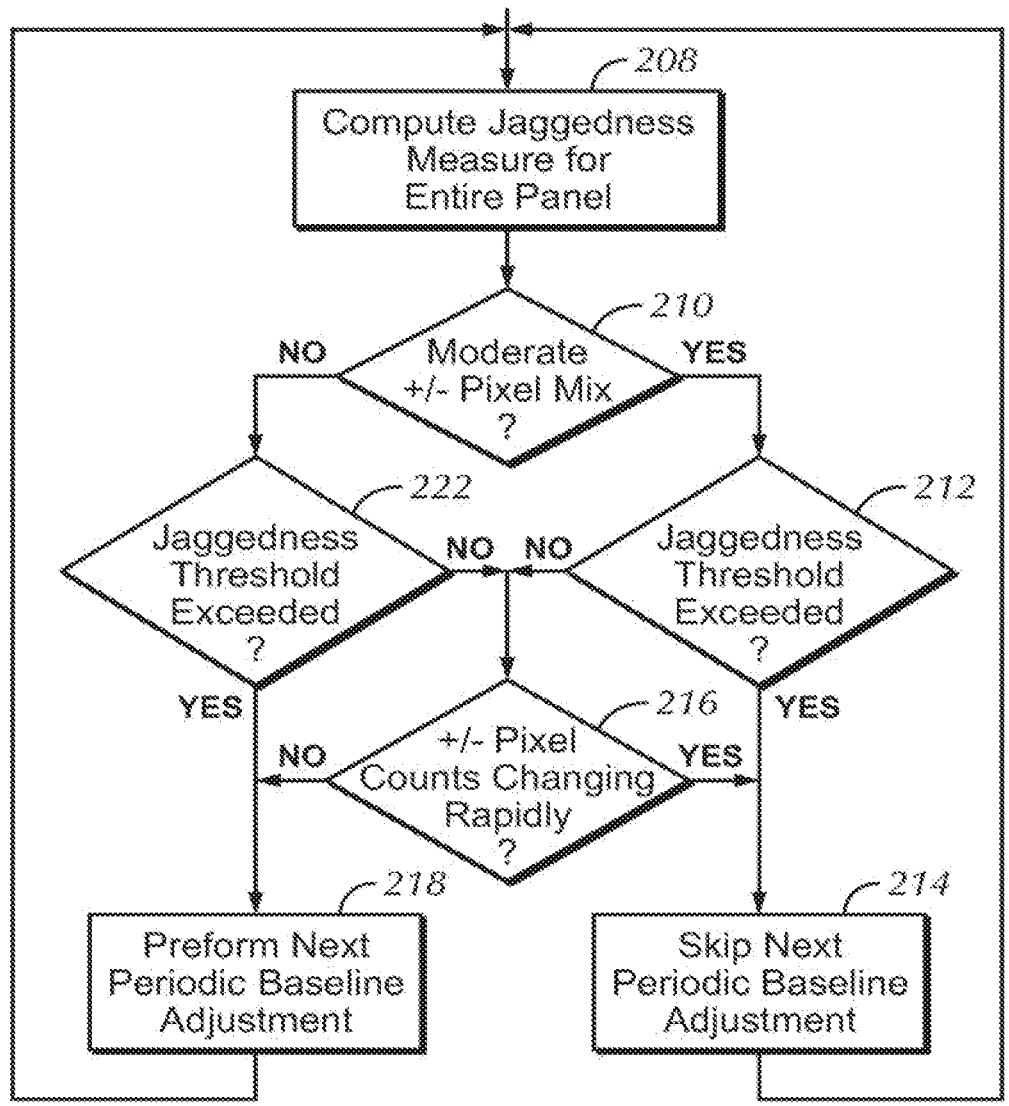
FIG. 2b illustrates an exemplary flow diagram of the use of the image jaggedness filter according to one embodiment of this invention.

FIG. 2b illustrates an exemplary flow diagram of the use of the image jaggedness filter according to embodiments of the invention. In FIG. 2, a jaggedness measure can be obtained at 208. To accomplish this, the jaggedness/irregularity filter as mentioned above can be applied to all rows and columns to generate a jaggedness measure for the entire image. In some embodiments, the jaggedness measure for all rows and columns can be averaged and normalized. Alternatively, a spatial Fourier transform can be used.

If a moderate (relatively even) mix of negative and positive pixels are found or are within a particular mix threshold at 210, and a certain jaggedness threshold is exceeded at 212, indicating the presence of numerous poorly grounded objects such as water droplets, then the next periodic local baseline offset adjustment can be skipped at 214. For example, a "moderate" mix of negative and positive pixels may be defined as having percentages of negative and positive pixels are within 40% of each other—30% and 70%. All other percentages would not be considered "moderate." Additionally, if the jaggedness measure is normalized between [0,1], with "0" being not jagged (no ungrounded objects) and "1" being completely jagged (many small ungrounded objects), then the jaggedness threshold could be set to 0.5.

If the jaggedness threshold is not exceeded at 212, but the number of positive and negative pixels is changing rapidly at 216 (which can occur when water droplets are evaporating), periodic local baseline offset adjustments can also be suppressed at 214. To make this determination of whether the number of positive and negative pixels are changing rapidly, the sums of the negative and positive pixels can be passed though a (mathematical) low pass filter (LFP) that produces an auto-regressive average. Instantaneous values can then be subtracted from the average. If the difference is high (greater than a predetermined threshold, such as the instantaneous value being more than 25% different from the computed average), this indicates a large change in the number of negative or positive pixels sufficient to suppress periodic local baseline offset adjustments. On the other hand, if the number of positive and negative pixels is not changing rapidly at 216, then the next periodic local baseline offset adjustment can occur as scheduled at 218 (including the suppression of an initial baseline capture if fingers are detected at startup, as disclosed in U.S. application Ser. No. 11/650,112 entitled "Periodic Sensor Panel Baseline Adjustment," the contents of which are incorporated by reference herein in their entirety for all purposes).

If the mix of negative and positive pixels is not moderate at 210 (e.g. many more positive pixels than negative pixels, or vice versa), the jaggedness threshold is not exceeded at 222, and the mix of negative and positive pixels is changing rapidly at 216, periodic local baseline offset adjustments can be suppressed at 214. However, if the mix of negative and positive pixels is not changing rapidly at 216, periodic local baseline offset adjustments can be performed at 218.

After enough water evaporates, no significant number of negative pixels may remain, but some positive pixels may remain. If the positive pixels are scattered spatially, they can still cause the jaggedness measure to be above the threshold. Note that the jaggedness algorithm may only recognize that the jaggedness measure has exceeded a threshold—it does not see actual negative and positive pixels, so it cannot determine that there are few negative pixels remaining. Thus, if the mix of negative and positive pixels is not moderate at 210, but the jaggedness threshold is exceeded at 222, periodic local baseline offset adjustments can be performed at 218. In addition, to compensate for this effect, the increment/decrement rate of the adaptation algorithm can be sped up, so that the positive pixels are compensated more quickly and the effect is reduced.

Global Baseline Offset

As described above, there are situations in which it can be preferable to delay periodic local baseline offset adjustments so that ungrounded touches do not cause erroneous adjustments to the sensor offset values. Additionally, with conventional keyboards having trackpads, inadvertent touch events can be commonplace while the keyboard is being utilized, presenting another situation where it can be preferable to keep the adaptation rate slower so that patches due to hovering or inadvertent touches do not get incorporated into the sensor offset values. However, it can still desirable to quickly compensate for temperature or other global effects.

Therefore, in addition to the periodic local baseline offset adjustment algorithm described above that can cause sensor offset values to be incrementally adapted or changed on a pixel-by-pixel (local) basis, in other embodiments of the invention a global baseline offset can be applied to the offset values for all pixels. The global baseline offset can be used to effect changes much more quickly than the periodic local baseline offset adjustment algorithm to compensate for large temperature changes or the effects of other global conditions. In some embodiments, the full amount of this global baseline offset can be immediately applied to the offset values for all pixels. In other embodiments, the offset values for all pixels can be incremented or decremented gradually over time (but more often than the individual pixels can be incremented or decremented using local baseline offset adjustments), until the full amount of the global baseline offset has been applied.

Figure 3:
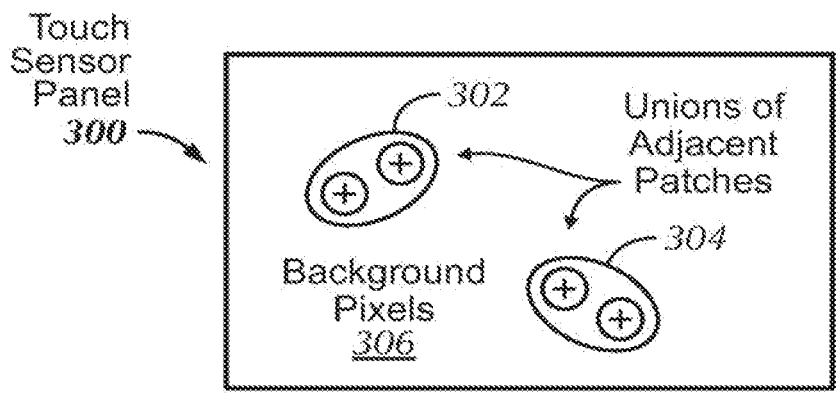
FIG. 3 illustrates an exemplary image of touch on touch sensor panel showing how a global baseline offset can be determined according to one embodiment of this invention.

FIG. 3 illustrates an exemplary image of touch on touch sensor panel 300 showing how a global baseline offset value can be determined according to embodiments of the invention. First, in some embodiments, unions of adjacent or nearby patches can be determined (see 302 and 304). To determine which patches should be grouped together, any number of methods can be used, such as computing the centroids of the patches and grouping together those pixels whose centroids are closest together. The union of those patches can be formed based on the touch sensor output values within the patches. For example, for any two grouped patches, all pixels within those two patches having touch sensor output values above a certain threshold can be considered part of the union. These union areas can be blocked out from subsequent calculations so that only background pixels 306 remain. In other embodiments, unions need not be formed, and only the patches themselves can be excluded from the background pixels.

An average of all or a portion of the background pixels 306 can then be computed, and this average can then used to globally modify the offset values for all pixels in the touch sensor panel. Because the background pixels 306 are untouched, the average of their untouched output values can provide an indication of rapid changes to the pixel outputs due to factors such as temperature. This average, or some adjustment value that is a function of this average, can then be added to or subtracted from the current sensor baseline to compute the global baseline offset value. This global baseline offset value can then be added to the current offset values for every pixel in the touch sensor panel to effect a global adjustment of the offset values. In some embodiments, this global baseline offset value can be applied immediately to the current offset values for every pixel. In other embodiments, the current offset values can be incremented or decremented gradually until the full global baseline offset values has been applied. To keep the normalized sensor output values from "running away" (e.g. getting excessively large or small) due to unintended artifacts of the algorithm such as an accumulation of roundoff error, the global baseline offset value can optionally decay to zero over time.

Figure 4A:
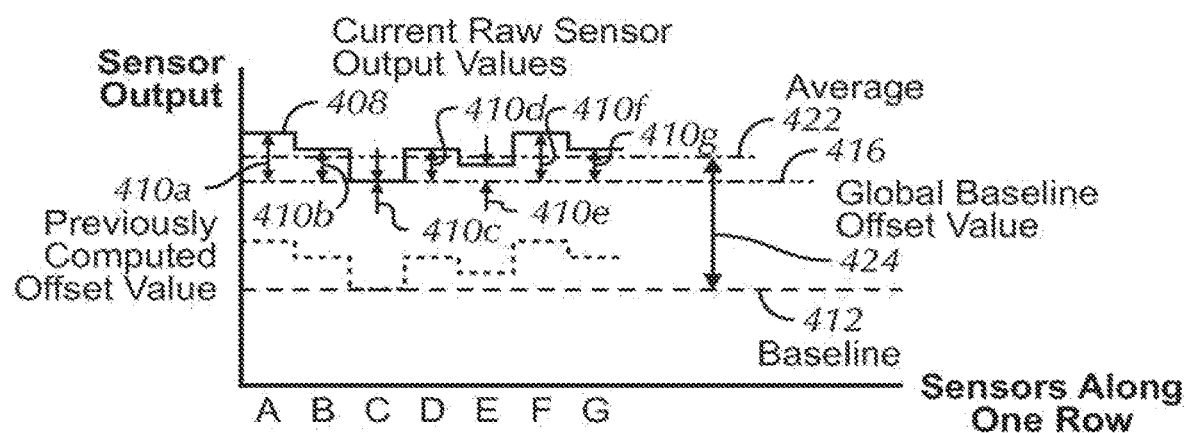
FIG. 4a illustrates the computation of an exemplary periodic global baseline offset adjustment value for a single row of pixels (sensors) A-G in a touch sensor panel according to embodiments of the invention.

FIG. 4a illustrates the computation of an exemplary periodic global baseline offset value for a single row of pixels (sensors) A-G in a touch sensor panel according to embodiments of the invention. Although not shown, it should be understood that each row in the touch sensor panel can be involved in the computation of this global baseline offset value. In the example of FIG. 4a, current no-touch (i.e. background) raw sensor output values 408 have risen substantially and in a fairly uniform manner from previous no-touch raw sensor output values 420 due to a change in some condition such as a temperature increase. As such, subtracting of the previous sensor offset values 410-A through 410-G from the current raw sensor output values 408 results in normalized values 416 well above the original baseline 412, which can create errors in touch detection and interpretation. To perform a global baseline offset adjustment on all offset values in the touch sensor panel, an average of the background pixels can first be computed. In the example of FIG. 4a, the average is shown at 422. Next, the difference between this average and the original baseline 412 can be computed as the global baseline offset value 424. This global baseline offset value 424 can then be added to the previous sensor offset values 410-A through 410-G to produce updated sensor offset values and effect a global adjustment of the offset values.

Figure 4B:
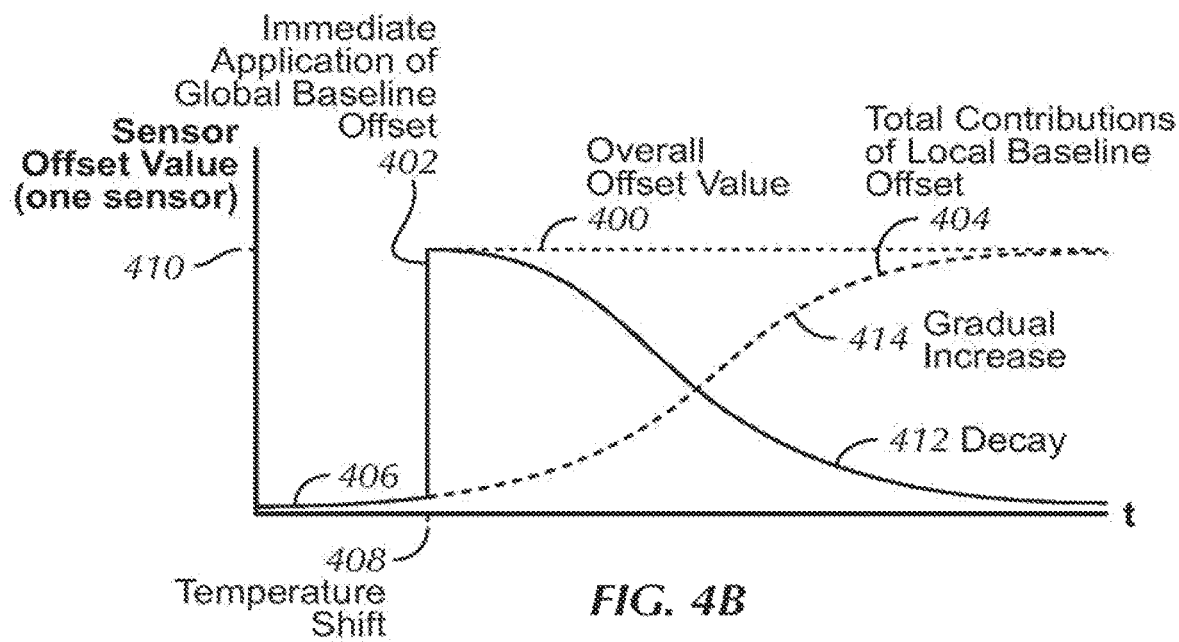
FIG. 4b illustrates an exemplary plot of the overall offset value for a single sensor over time including the total contributions of a local baseline offset and the contribution of a global baseline offset according to one embodiment of this invention.

FIG. 4b illustrates an exemplary plot of the overall offset value 400 for a single sensor over time including the total contributions of a local baseline offset 404 and the contribution of a global baseline offset 402 according to embodiments of the invention. In the example of FIG. 4b, the offset value 400, global baseline offset value 402, and the total contribution of the local baseline offset value 404 start near zero at 406, indicating that the raw no-touch sensor output value for that sensor is approximately equal to the desired baseline value. If a temperature shift or other environmental condition is detected at 408 resulting in a rapid increase in the average of the background pixels (e.g., a change of more than 25% over the span of a minute), the full amount of the calculated global baseline offset value 402 can be immediately added to the sensor offset value, causing the overall sensor offset value 400 to increase rapidly to a value 410 equal to the difference between the average of the background pixels and the original baseline as described above. The global baseline offset value 402 can then decay back to zero over time at 412 to ensure that the offset value does not get excessively large or small due to unintended artifacts of the algorithm.

However, if the increase in the raw sensor output values remains, even while the global baseline offset value 402 is decaying back down to zero, another mechanism is needed to ensure that an increase to the overall offset value does occur. To accomplish this, the local baseline offset adjustment algorithm described above can periodically incrementally increase the overall offset value 400 as the global baseline offset value 402 is decaying. Although each increment to the overall offset value 400 made by the local baseline offset adjustment algorithm is small, the total contribution of the local baseline offset value 404 gradually increases over time, as shown at 414 in FIG. 4b.

Figure 4C:
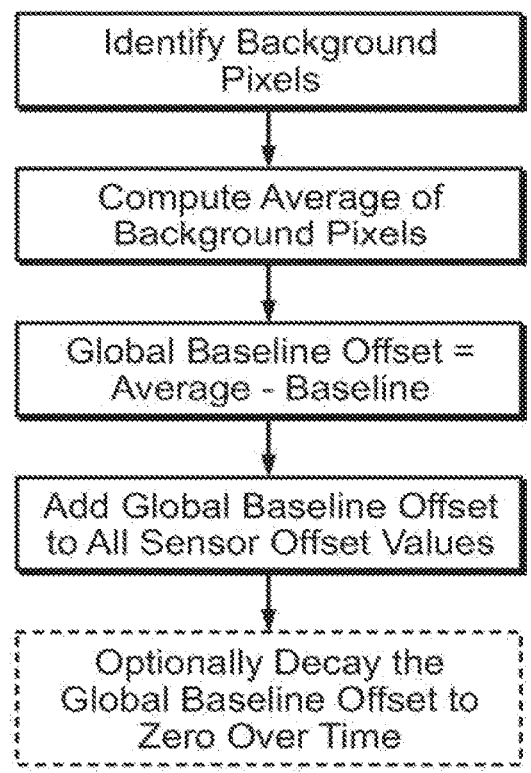
FIG. 4c illustrates an exemplary flowchart or algorithm for implementing the global baseline offset algorithm according to embodiments of the invention.

FIG. 4c illustrates an exemplary flowchart or algorithm for implementing the global baseline offset algorithm as described above according to embodiments of the invention.

Although not shown, similar adjustments to the overall sensor offset value of each pixel can be made in the negative direction if the average of the background pixels rapidly decreases.

Figure 4D:
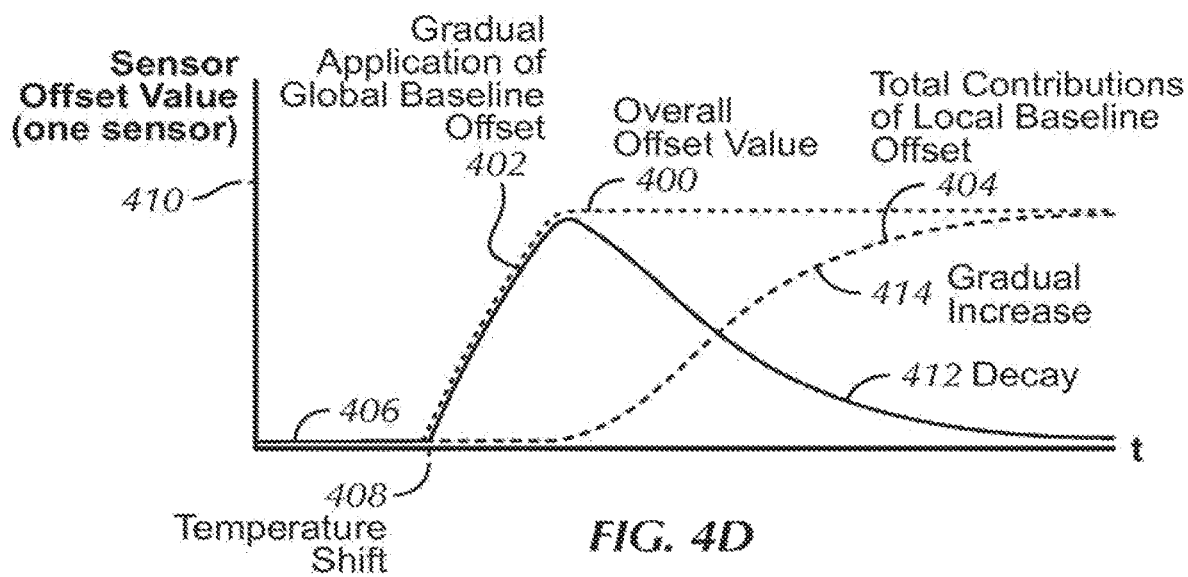
FIG. 4d illustrates an exemplary plot of the overall offset value for a single sensor over time wherein the global baseline offset value is applied to the sensor offset value gradually according to embodiments of the invention.

FIG. 4d illustrates an exemplary plot of the overall offset value 400 for a single sensor over time wherein the global baseline offset value is applied to the sensor offset value gradually according to embodiments of the invention. In the example of FIG. 4d, the global baseline offset value 402 can be incrementally added to the sensor offset value, causing the overall sensor offset value 400 to increase gradually to a value 410 equal to the difference between the average of the background pixels and the original baseline as described above. It should be noted that although the global baseline offset value is applied incrementally, the increment period can be much faster than the local baseline offset adjustment described above. The global baseline offset value 402 can then decay back to zero over time at 412 to ensure that the offset value does not get excessively large or small due to unintended artifacts of the algorithm.

Motion Component Dominance Factors for Motion Locking

In the processing of touch images, after touch images (e.g. from two fingers) are captured, identified and tracked over multiple panel scans, motion components can be extracted.

In the case of two fingers, motion components can include the X component, the Y component, a scale (zoom) component (the dot product of the two finger motion vectors), and a rotate component (the cross product of the two finger motion vectors). The extracted motion components can provide for two types of control. "Integral control" is defined herein as providing all four degrees of freedom (the ability to control all axes at once). "Separable control" is more limited, and separates motion between either (1) X-Y scrolling as a set, (2) zoom, or (3) rotate (i.e. one axis).

Figure 5:
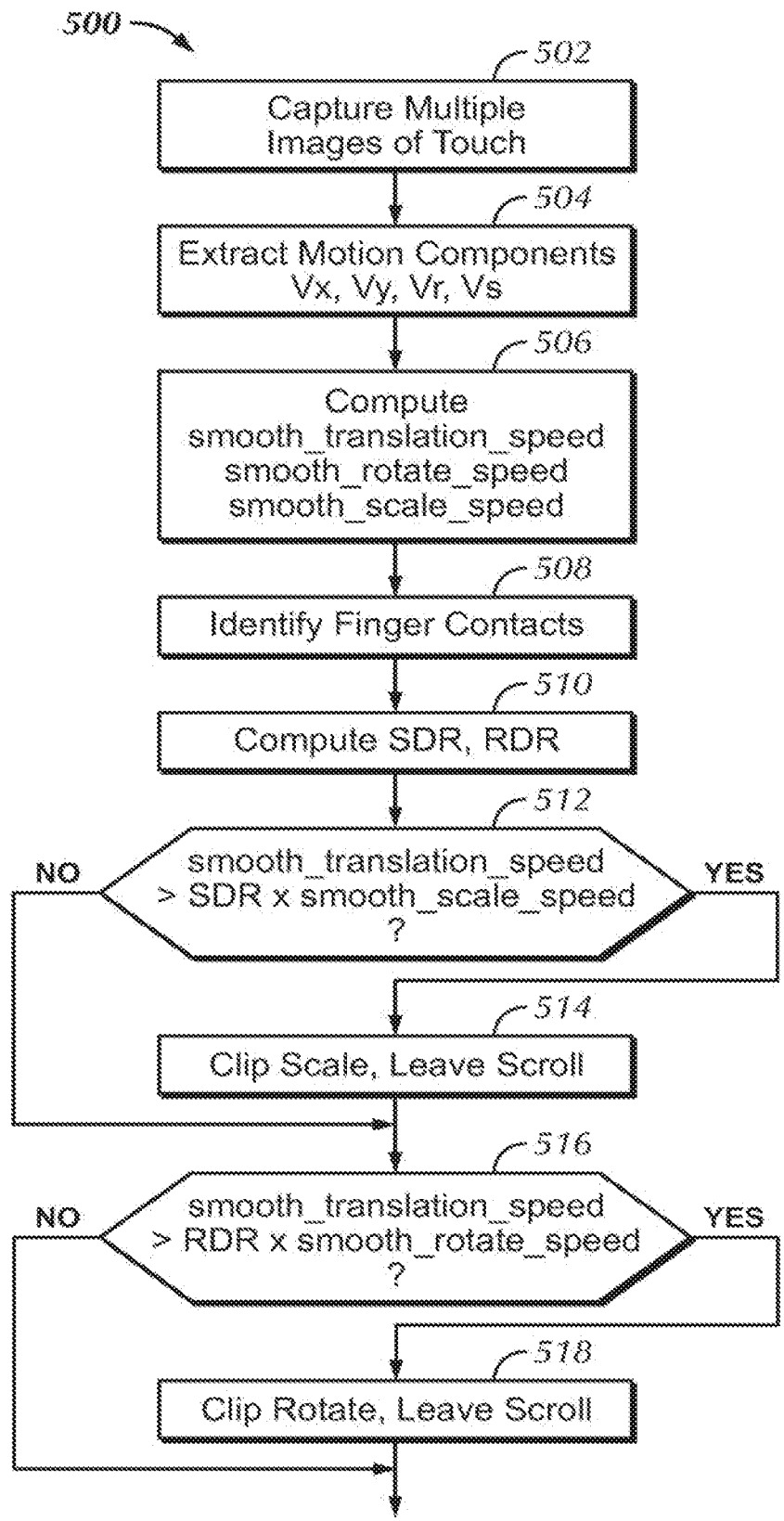
FIG. 5 illustrates an exemplary motion component dominance algorithm that can be implemented by a processor executing firmware according to embodiments of the invention.

FIG. 5 illustrates an exemplary motion component dominance algorithm 500 that can be implemented by a processor executing firmware according to embodiments of the invention. After multiple images of touch are captured at 502, motion components such as the x-direction velocity (Vx), y-direction velocity (Vy), rotational velocity (Vr), and scaling velocity (Vs) can be extracted at 504. To implement separable control, embodiments of the invention can lock onto the first component (axis) with significant motion, and ignore the others. For example, if significant X-Y scrolling is detected first, subsequently detected zooming motions may be ignored until liftoff of the fingers. To lock onto the first component with significant motion, a low pass filter (LPF) can be applied to the computed velocities of the extracted motion components to compute the following at 506:

$$\text{Smooth\_translation\_speed} = (\text{LPF}(Vx)^2 + \text{LPF}(Vy)^2)^{0.5}$$

$$\text{Smooth\_rotate\_speed} = \text{LPF}(Vr)$$

$$\text{Smooth\_scale\_speed} = \text{LPF}(Vs)$$

Note that the smooth_translation_speed value includes Vx and Vy because of the desire to lock onto scrolling as a whole, not just the X and Y components. Of these three values, the dominant (largest) computed speed can be used, while the others can be ignored (zeroed or clipped out).

However, in practice it can be difficult to lock on properly, because a scroll motion might initially look like a rotate motion, for example, or vice versa. Therefore, in embodiments of the invention, the three raw values described above can be utilized in conjunction with two new parameters, scale_dominance_ratio (SDR) and rotate_dominance_ratio (RDR), which can be used to apply weights to the various motion components and set a balance point for the motions so that a particular component can be locked onto more accurately. The SDR and RDR values can be established after the various finger contacts are identified at 508. The SDR and RDR values computed at 510 can be based on whether the detected contacts are identified as fingers and/or thumbs. For example, if a thumb is detected, it can be more likely that a user is using a thumb and finger to perform a scaling (zoom) or rotate operation rather than a translation or scroll operation, so the SDR and RDR values can be set to high values (e.g. 2.5) so that the Smooth_scale_speed or the Smooth_rotate_speed values dominate the Smooth_translation_speed value.

However, if two or more fingers are detected, but not a thumb, it is more likely that a user is using the two fingers to perform a translation or scroll operation rather than a scaling or rotate operation, so the SDR and RDR values can be set to lower values to ensure that the Smooth_translation_speed value dominates. The multiple-finger, no-thumb SDR value can further be a function of the horizontal separation of the fingers, because it can be more likely that a user is performing a translation or scroll operation when the fingers are close together, but more likely that a user is performing a two finger scaling operation when the fingers have a greater separation. Thus, for example, the SDR can be set to 0.25 if the finger separation is between 0 and 3 cm, can vary from 0.25 to 1.25 if the separation is from 3-6 cm, and can be set to 1.25 for separations greater than 6 cm.

In further embodiments, an exception can be created for the SDR during a two-finger top-to-bottom translation because of the tendency for a user's fingers to draw together during the translation. The movement of the fingers towards each other during the translation should not be interpreted as a scaling operation. To prevent this, if a downward translation is detected plus a scale contraction, then the SDR can be maintained at 0.25, even if the two finger separation distance is high.

After the SDR and RDR values are computed at 510, the following pseudocode can then be implemented at 512, 514, 516 and 518:

Variables: scale_dominance_ratio (SDR), rotate_dominance_ratio (RDR)

If(smooth_translation_speed>SDR×smooth_scale_speed),then

Clip scale(Vx→pass,Vs→zero)Leave scroll;　　(A)

If(smooth_translation_speed>RDR×smooth_rotate_speed),then

Clip rotate(Vx→pass,Vr→zero)Leave scroll.　　(B)

In other embodiments, where the movement of contacts along with contact identifications provides an ambiguous determination of which motion component to lock onto, locking onto a particular motion component can be delayed until enough motion has occurred to make a more accurate determination. To accomplish this, an axis_domination_confidence value can be computed to provide a representation of the unambiguousness of the motion component to be locked onto.

Figure 6:
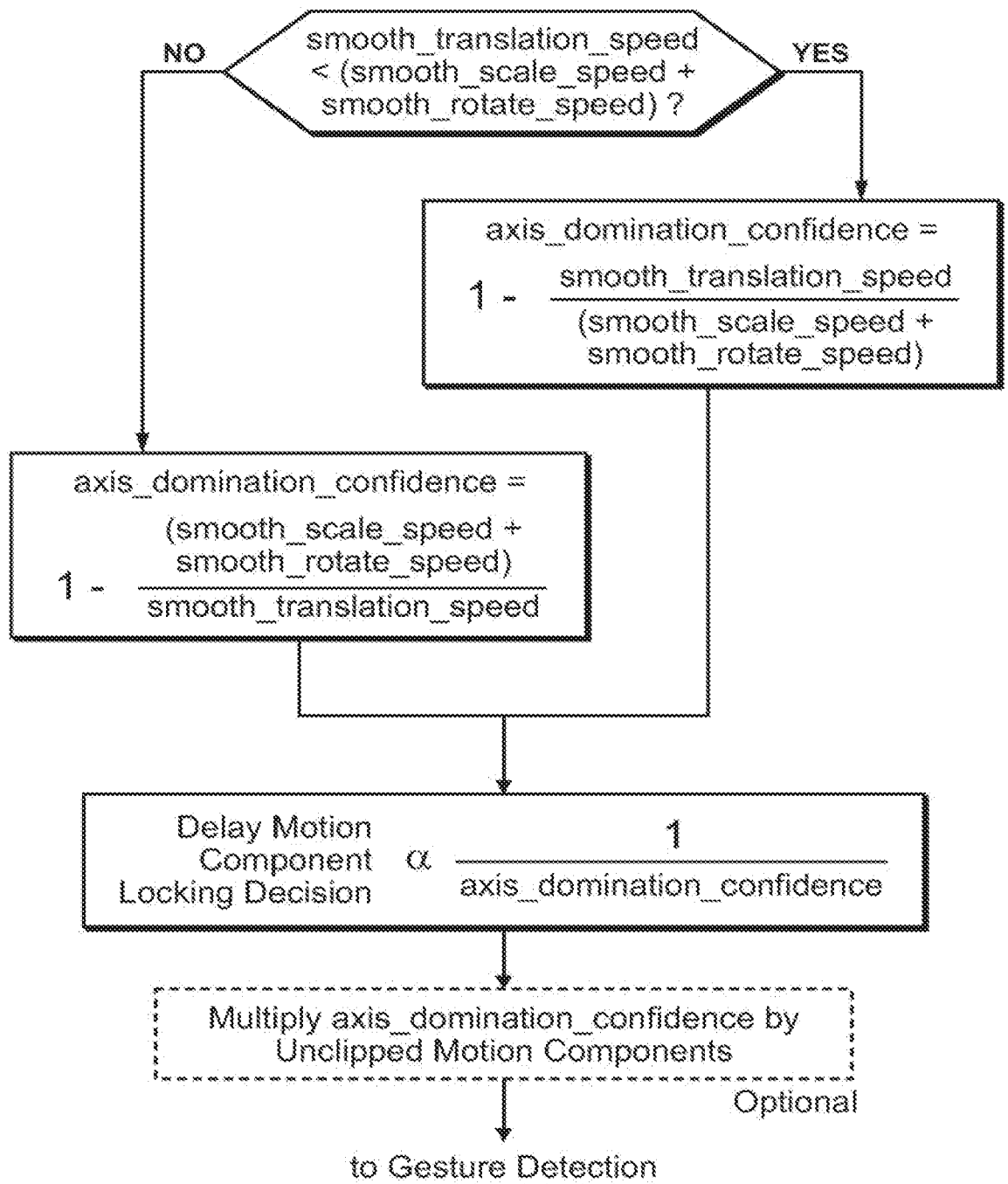
FIG. 6 illustrates an exemplary algorithm for computing an axis_domination_confidence value that can be implemented by a processor executing firmware according to embodiments of the invention.

FIG. 6 illustrates an exemplary algorithm 600 for computing an axis_domination_confidence value that can be implemented by a processor executing firmware according to embodiments of the invention. If smooth_translation_speed<(smooth_scale_speed+smooth_rotate_speed) at 602, then $$\text{axis\_domination\_confidence} = 1 - \frac{\text{smooth\_translation\_speed}}{(\text{smooth\_scale\_speed} + \text{smooth\_rotate\_speed})}.$$

at 604. Otherwise, at 606, $$\text{axis\_domination\_confidence} = 1 - \frac{(\text{smooth\_scale\_speed} + \text{smooth\_rotate\_speed})}{\text{smooth\_translation\_speed}}.$$

The axis_domination_confidence value as calculated above can be normalized to be between [0,1], where values approaching 1 represent a pure translation (and therefore there is high confidence in locking on to the X-Y motion components) and values approaching 0 indicate that the translation amount is about equal to the scale and rotation amount (and therefore low confidence in locking on to any motion component).

After the axis_domination_confidence value is computed, in one embodiment the motion component locking decision can be delayed by an amount proportional to the inverse of the axis_domination_confidence value at 608. Thus, if the value is high, indicating high confidence, there can be little or no delay. However, if the value is low, indicating low confidence, the locking decision can be delayed to allow for the motion components to become less ambiguous.

In another embodiment, the axis_domination_confidence value (or the square of this value) can be multiplied by any non-clipped motion components (see, e.g., equations (A) and (B) above) at 610. This has the effect of slowing down the ultimate gesture decision. For example, if the axis_domination_confidence value is 1 and this is multiplied by the unclipped motion component, the motion will be locked onto and integrated quickly in gesture detection algorithms. However, if no motion component has been locked onto, and motion is being integrated but the dominant motion component is borderline, when the motion component is multiplied by a low axis_domination_confidence value, this can dampen the motion and extend the integration period. This can delay the triggering of a decision on which motion components to pass and which motion components to clip and ultimately the identification of gestures. During this delay time, the motions can become more unambiguous. Once locked, it is not necessary to apply the axis_domination_confidence value any more.

Embodiments of the invention described above can be implemented, for example, using touch sensor panels of the types described in U.S. application Ser. No. 11/650,049 entitled "Double-Sided Touch Sensitive Panel and Flex Circuit Bonding." Sense channels of the types described in U.S. application Ser. No. 11/649,998 entitled "Proximity and Multi-Touch Sensor Detection and Demodulation" can be used, for example, to detect touch and hover events. The resulting image of touch can be further processed to determine the location of the touch events, the identification of finger contacts, and the identification of gestures as described, for example, in U.S. application Ser. No. 11/428,522 entitled "Identifying Contacts on a Touch Surface," U.S. application Ser. No. 11/756,211 entitled "Multi-touch Input Discrimination," and U.S. application Ser. No. 10/903,964 entitled "Gestures for Touch Sensitive Input Devices." All of the preceding applications referred to in this paragraph are incorporated by reference herein in their entirety for all purposes.

Figure 7:
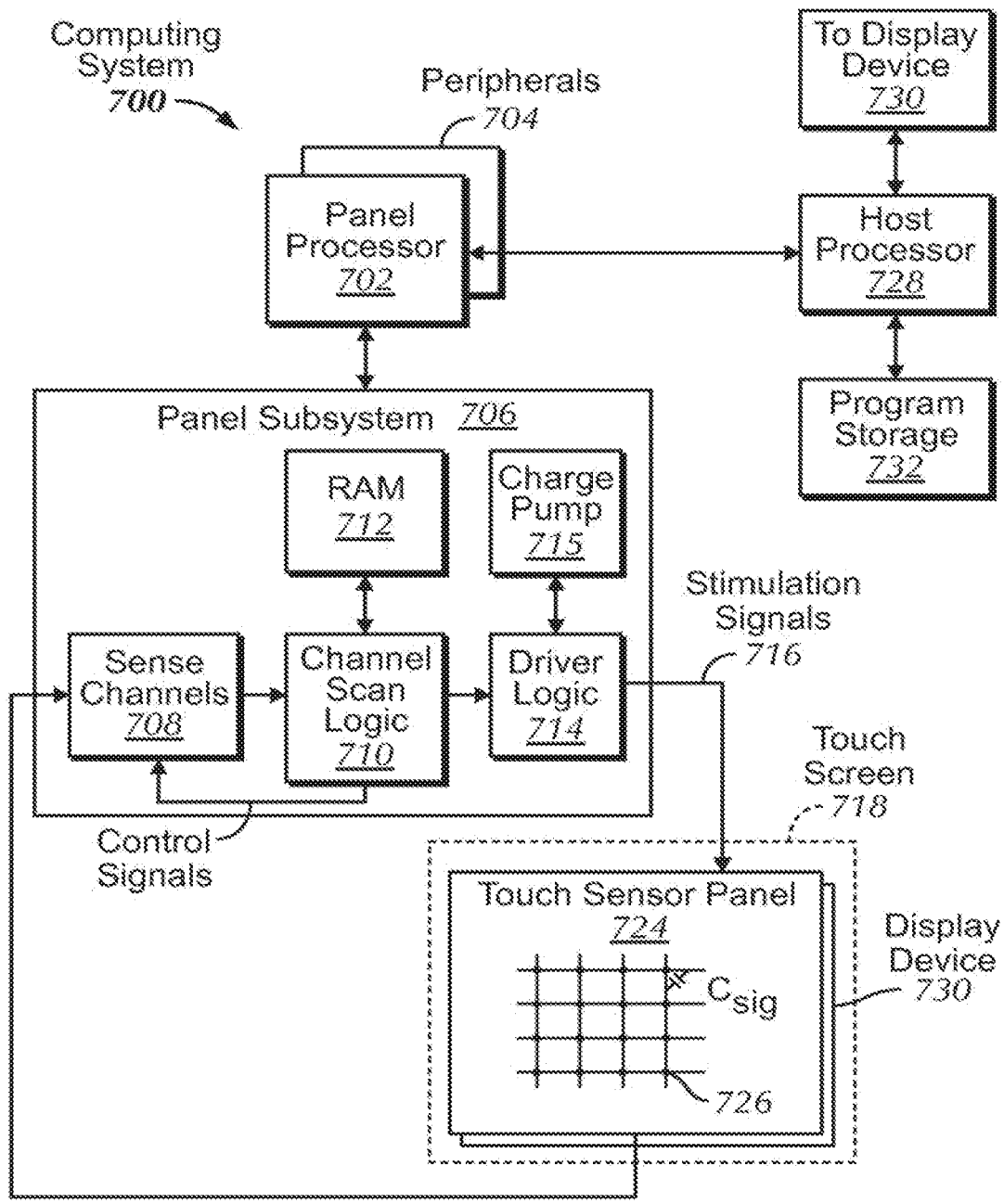
FIG. 7 illustrates an exemplary computing system operable with a touch sensor panel to implement the image jaggedness filter, global baseline offset, and motion component dominance factors according to one embodiment of this invention.

FIG. 7 illustrates exemplary computing system 700 that can include one or more of the embodiments of the invention described above. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to drive lines of touch sensor panel 724 at a voltage established by charge pump 715. In some embodiments, panel subsystem 706, panel processor 702 and peripherals 704 can be integrated into a single application specific integrated circuit (ASIC).

Touch sensor panel 724 can include a capacitive sensing medium having a plurality of drive lines and a plurality of sense lines, although other sensing media can also be used. Each intersection, adjacency or near-adjacency of drive and sense lines can represent a capacitive sensing node and can be viewed as picture element (pixel) 726, which can be particularly useful when touch sensor panel 724 is viewed as capturing an "image" of touch. (In other words, after panel subsystem 706 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 724 can drive sense channel 708 (also referred to herein as an event detection and demodulation circuit) in panel subsystem 706.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 730 such as an LCD display for providing a UI to a user of the device. Display device 730 together with touch sensor panel 724, when located partially or entirely under the touch sensor panel, or partially or entirely integrated with the touch sensor panel, can form touch screen 718.

Note that one or more of the functions described above can be performed by firmware stored in memory (e.g. one of the peripherals 704 in FIG. 7) and executed by panel processor 702, or stored in program storage 732 and executed by host processor 728. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any storage medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 8A:
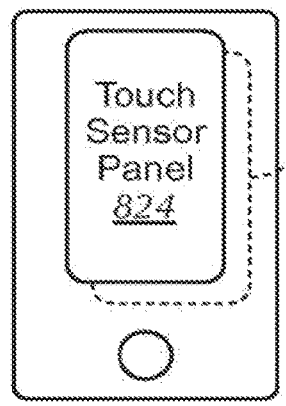
FIG. 8a illustrates an exemplary mobile telephone that can include a touch sensor panel and computing system for implementing the image jaggedness filter, global baseline offset, and motion component dominance factors according to one embodiment of this invention.

FIG. 8a illustrates exemplary mobile telephone 836 that can include touch sensor panel 824 and computing system 842 for implementing the image jaggedness filter, global baseline offset, and motion component dominance factors described above according to embodiments of the invention.

Figure 8B:
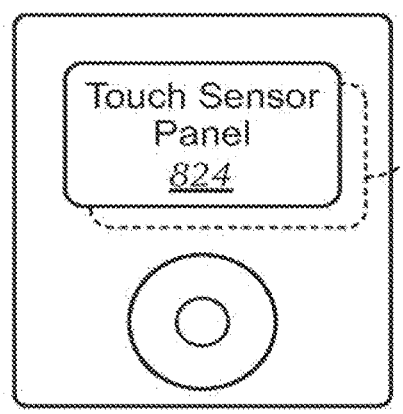
FIG. 8b illustrates an exemplary digital media player that can include a touch sensor panel and computing system for implementing the image jaggedness filter, global baseline offset, and motion component dominance factors according to one embodiment of this invention.

FIG. 8b illustrates exemplary digital media player 840 that can include touch sensor panel 824 and computing system 642 for implementing the image jaggedness filter, global baseline offset, and motion component dominance factors described above according to embodiments of the invention.

Figure 8C:
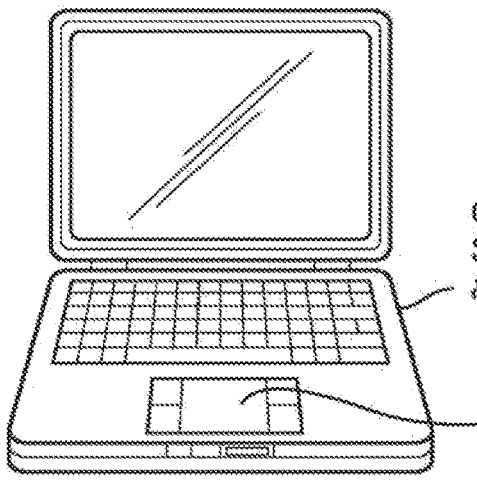
FIG. 8c illustrates an exemplary personal computer that can include a touch sensor panel and computing system for implementing the image jaggedness filter, global baseline offset, and motion component dominance factors according to one embodiment of this invention.

FIG. 8c illustrates exemplary personal computer 844 that can include touch sensor panel (trackpad) 824 and computing system 842 for implementing the image jaggedness filter, global baseline offset, and motion component dominance factors described above according to embodiments of the invention. The mobile telephone, media player, and personal computer of FIGS. 8a, 8b and 8c can advantageously benefit from the image jaggedness filter, global baseline offset, and motion component dominance factors described above because implementation of these features can improve the normalized outputs of the touch sensor panel and the recognition of gestures.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An apparatus for adjusting sensor output values captured on a touch panel, the apparatus comprising:
   scan logic couplable to the touch panel and configured for performing a scan of the touch panel to capture the sensor output values for a plurality of sensors on the touch panel; and
   a processor coupled to the scan logic and configured for
      normalizing the sensor output values using a plurality of stored local baseline offset values,
      identifying a first subset of normalized sensor output values, less than a full set of the normalized sensor output values, that are different from a sensor output baseline value, and identifying a first subset of sensors, less than a full set of the plurality of sensors, corresponding to the first subset of normalized sensor output values, and
      selectively adjusting the sensor output values by individually adjusting a first subset of local baseline offset values, less than a full set of the plurality of stored local baseline offset values and corresponding to the first subset of sensors, and applying the plurality of stored local baseline offset values including the individually adjusted first subset of local baseline offset values to sensor output values captured in subsequent scans of the touch panel.

2. The apparatus of claim 1, the processor further configured for individually adjusting the first subset of local baseline offset values by:
   increasing each local baseline offset value in the first subset of local baseline offset values whose corresponding normalized sensor output value was greater than the sensor output baseline value; and
   decreasing each local baseline offset value in the first subset of local baseline offset values whose corresponding normalized sensor output value was less than the sensor output baseline value.

3. The apparatus of claim 2, wherein the increase or decrease in each local baseline offset value is an amount of adjustment equal to a difference between each local baseline offset value and the sensor output baseline value.

4. The apparatus of claim 2, the processor further configured for increasing or decreasing each local baseline offset value by an amount equal to a fraction of the difference between each local baseline offset value and the sensor output baseline value, and repeating this adjustment over time.

5. The apparatus of claim 1, the apparatus comprising at least one of a computing device, a media player, or a mobile telephone.

6. A method for adjusting sensor output values captured on a touch panel, the method comprising:
   capturing the sensor output values for a plurality of sensors on the touch panel;
   normalizing the sensor output values using a plurality of stored local baseline offset values;
   identifying a first subset of normalized sensor output values, less than a full set of the normalized sensor output values, that are different from a sensor output baseline value, and identifying a first subset of sensors, less than a full set of the plurality of sensors, corresponding to the first subset of normalized sensor output values; and
   selectively adjusting the sensor output values by individually adjusting a first subset of local baseline offset values, less than a full set of the plurality of stored local baseline offset values and corresponding to the first subset of sensors, and applying the plurality of stored local baseline offset values including the individually adjusted first subset of local baseline offset values to sensor output values captured in subsequent scans of the touch panel.

7. The method of claim 6, further comprising individually adjusting the first subset of local baseline offset values by:
   increasing each local baseline offset value in the first subset of local baseline offset values whose corresponding normalized sensor output value was greater than the sensor output baseline value; and
   decreasing each local baseline offset value in the first subset of local baseline offset values whose corresponding normalized sensor output value was less than the sensor output baseline value.

8. The method of claim 7, wherein the increase or decrease in each local baseline offset value is an amount of adjustment equal to a difference between each local baseline offset value and the sensor output baseline value.

9. The method of claim 7, further comprising increasing or decreasing each local baseline offset value by an amount equal to a fraction of the difference between each local baseline offset value and the sensor output baseline value, and repeating this adjustment over time.

10. A non-transitory computer readable storage medium storing one or more programs, the one or more programs comprising instructions, which when executed by one or more processors of an electronic device, cause the electronic device to perform a method comprising:

capturing the sensor output values for a plurality of sensors on the touch panel;

normalizing the sensor output values using a plurality of stored local baseline offset values;

identifying a first subset of normalized sensor output values, less than a full set of the normalized sensor output values, that are different from a sensor output baseline value, and identifying a first subset of sensors, less than a full set of the plurality of sensors, corresponding to the first subset of normalized sensor output values; and selectively adjusting the sensor output values by individually adjusting a first subset of local baseline offset values, less than a full set of the plurality of stored local baseline offset values and corresponding to the first subset of sensors, and applying the plurality of stored local baseline offset values including the individually adjusted first subset of local baseline offset values to sensor output values captured in subsequent scans of the touch panel.

11. The non-transitory computer readable storage medium of claim 10, the method further comprising individually adjusting the first subset of local baseline offset values by:

increasing each local baseline offset value in the first subset of local baseline offset values whose corresponding normalized sensor output value was greater than the sensor output baseline value; and decreasing each local baseline offset value in the first subset of local baseline offset values whose corresponding normalized sensor output value was less than the sensor output baseline value.

12. The non-transitory computer readable storage medium of claim 11, wherein the increase or decrease in each local baseline offset value is an amount of adjustment equal to a difference between each local baseline offset value and the sensor output baseline value.

\* \* \* \* \*